United States Patent
Rao

(10) Patent No.: US 11,765,597 B2
(45) Date of Patent: Sep. 19, 2023

(54) LAWFUL INTERCEPTION USING SERVICE-BASED INTERFACES IN COMMUNICATION SYSTEMS

(71) Applicant: Nokia Technologies Oy, Espoo (FI)

(72) Inventor: Nagaraja Rao, Boca Raton, FL (US)

(73) Assignee: Nokia Technologies Oy, Espoo (FI)

( * ) Notice: Subject to any disclaimer, the term of this patent is extended or adjusted under 35 U.S.C. 154(b) by 459 days.

(21) Appl. No.: 16/962,919

(22) PCT Filed: Jan. 15, 2019

(86) PCT No.: PCT/US2019/013637
§ 371 (c)(1),
(2) Date: Jul. 17, 2020

(87) PCT Pub. No.: WO2019/147435
PCT Pub. Date: Aug. 1, 2019

(65) Prior Publication Data
US 2021/0067955 A1    Mar. 4, 2021

Related U.S. Application Data

(60) Provisional application No. 62/622,524, filed on Jan. 26, 2018.

(51) Int. Cl.
*H04W 12/80* (2021.01)
*H04L 9/40* (2022.01)

(52) U.S. Cl.
CPC .......... *H04W 12/80* (2021.01); *H04L 63/306* (2013.01)

(58) Field of Classification Search
CPC ...... H04W 12/80; H04L 63/20; H04L 63/205; H04L 63/30; H04L 63/302; H04L 63/304; H04L 63/306
See application file for complete search history.

(56) References Cited

U.S. PATENT DOCUMENTS 9,622,160 B2 * 4/2017 Arzelier .............. H04W 12/033
9,794,771 B2 * 10/2017 Raveendran ............ H04W 8/08
(Continued)

FOREIGN PATENT DOCUMENTS

| CN | 102308550 A | 1/2012 |
| CN | 105075182 A | 11/2015 |

(Continued)

OTHER PUBLICATIONS

"3rd Generation Partnership Project;Technical Specification Group Services and System Aspects;System Architecture for the 5G System; Stage 2 (Release 15)", 3GPP TS 23.501, V15.0.0, Dec. 2017, pp. 1-181.

(Continued)

*Primary Examiner* — Hosuk Song
(74) *Attorney, Agent, or Firm* — Ryan, Mason & Lewis, LLP

(57) ABSTRACT

In a service provider network of a given communication system configured to support lawful interception functionality, one or more service-based interfaces are provisioned to enable interaction between one or more lawful interception-specific elements and one or more intercepting control elements. In one or more further implementations, methods provide for provisioning an interworking function specific for lawful interception functionality. The interworking function can be configured to support both service-based interfaces and point-to-point interfaces across a control plane and/or a user plane of the service provider network, as needed.

20 Claims, 23 Drawing Sheets

(56) References Cited

U.S. PATENT DOCUMENTS

| | | | |
|---|---|---|---|
| 11,109,305 B2* | 8/2021 | Horn | H04W 48/12 |
| 11,323,488 B2* | 5/2022 | Truchan | H04W 12/037 |
| 2013/0010963 A1 | 1/2013 | Farrugia et al. | |
| 2013/0080586 A1 | 3/2013 | Attanasio | |
| 2015/0181422 A1 | 6/2015 | Rombouts et al. | |
| 2019/0313234 A1* | 10/2019 | Liu | H04W 12/80 |
| 2022/0312198 A1* | 9/2022 | Koshta | H04W 12/041 |

FOREIGN PATENT DOCUMENTS

| | | | | |
|---|---|---|---|---|
| WO | 2011/155884 A1 | 12/2011 | | |
| WO | WO-2014107208 A1 * | 7/2014 | | H04B 7/024 |
| WO | 2018/013537 A1 | 1/2018 | | |

OTHER PUBLICATIONS

"3rd Generation Partnership Project; Technical Specification Group Services and Systems Aspects; Study on Lawful Interception (li) Service in 5g (release 15)", 3GPP TR 33.842, V0.0.0, Nov. 2017, pp. 1-15.

McQuaid et al., "Lawful Interception in Virtualized Networks", ETSI Standards, Sep. 2017, pp. 15-16.

"Lawful Interception for 3GPP: Cisco Service Independent Intercept in the GGSN", Cisco, Retrieved on Jun. 23, 2020, Webpage available at : https://tools.cisco.com/security/center/resources/lawful_interception_3pgg.

Wilke, "5G Network Architecture and FMC", ITU, Jul. 2017, 15 pages.

"3rd Generation Partnership Project;Technical Specification Group Services and System Aspects;Security; Lawful Interception requirements (Release 15)", 3GPP TS 33.126, V15.1.0, Dec. 2018, pp. 1-18.

"3rd Generation Partnership Project;Technical Specification Group Services and System Aspects;Security; Lawful Interception (LI) architecture and functions (Release 15)", 3GPP TS 33.127, V15.0.0, Dec. 2018, pp. 1-52.

International Search Report and Written Opinion received for corresponding Patent Cooperation Treaty Application No. PCT/US2019/013637, dated Apr. 23, 2019, 13 pages.

"S8HR LI/CUPS LI further details—capturing the email discussions", 3GPP TSG-SA WG3 LI Meeting #66, S3i170224, Agenda : 10.1, Nokia, Apr. 25-28, 2017, pp. 1-5.

"3rd Generation Partnership Project; Technical Specification Group Services and Systems Aspects; Study on Lawful Interception (li) Service in 5g (release 15)", 3GPP TR 33.842, V0.0.2, Nov. 2017, pp. 1-52.

Chinese Search Report/Office Action issued by the China Patent Office dated Jan. 28, 2023 for Chinese Patent Application No. 201980009812.3 which is a counterpart application of International Application No. PCT/US2019/013637, to which the current application claims priority.

* cited by examiner

LAWFUL INTERCEPTION USING SERVICE-BASED INTERFACES IN COMMUNICATION SYSTEMS

RELATED APPLICATION

This application claims priority to PCT Application No. PCT/US2019/013637, filed on Jan. 15, 2019, which claims priority to U.S. Provisional Application No. 62/622,524, filed on Jan. 26, 2018, each of which is incorporated herein by reference in its entirety.

FIELD

The field relates generally to communication systems, and more particularly, but not exclusively, to lawful interception within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The access point (e.g., gNB) is illustratively part of an access network of the communication system. For example, in a 5G network, the access network is referred to as a 5G System and is described in 5G Technical Specification (TS) 23.501, V15.0.0 (dated Dec. 22, 2017), entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

Privacy is an important consideration in any communication system. However, situations arise when it is required that one or more communications in a communication system, such as a 5G network, be subject to lawful interception (LI).

SUMMARY

Illustrative embodiments provide improved techniques for lawful interception in communication systems.

For example, in one illustrative embodiment, a method comprises the following step. In a service provider network of a given communication system configured to support lawful interception functionality, one or more service-based interfaces are provisioned to enable interaction between one or more lawful interception-specific elements and one or more intercepting control elements.

In one or more illustrative embodiments, methods provide for provisioning an interworking function specific for lawful interception functionality. The interworking function can be configured to support both service-based interfaces and point-to-point interfaces across a control plane and/or a user plane of the service provider network, as needed.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Embodiments will be illustrated herein in conjunction with example communication systems and associated techniques for providing lawful interception in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/ functions and/or operations that may interact with parts of the inventive solutions, e.g., the above-referenced 3GPP TS 23.501. Further, details relating to lawful interception in a 5G system are described in 3GPP TS 33.126, V15.1.0, entitled "Technical Specification Group Services and System Aspects; Security; Lawful Interception Requirements;" and 3GPP TS 33.127, V15.0.0, entitled "Technical Specification Group Services and System Aspects; Security; Lawful Interception Architecture and Functions," the disclosures of which are incorporated by reference herein in their entireties. Other 3GPP TS/TR documents may provide other details that one of ordinary skill in the art will realize. However, while well-suited for 5G-related 3GPP standards, embodiments are not necessarily intended to be limited to any particular standards.

Illustrative embodiments are related to lawful interception architectures for 5G networks. Prior to describing such illustrative embodiments, a general description of main components of a 5G network will be described below in the context of FIGS. 1 and 2.

Figure 1:
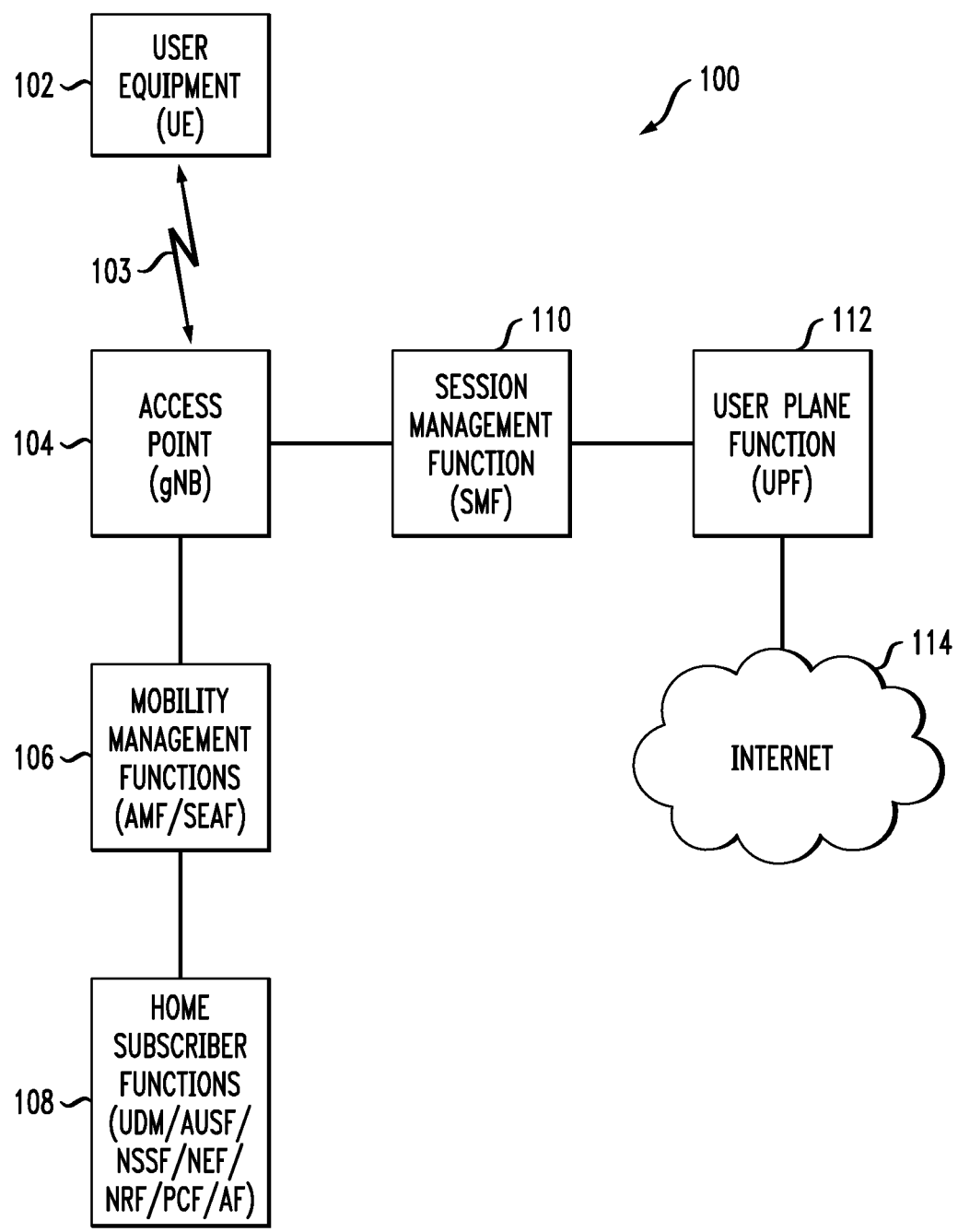
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, functions that facilitate an explanation of illustrative embodiments are represented. Subsequent figures may depict some additional elements/functions.

Accordingly, as shown, communication system 100 comprises user equipment (UE) 102 that communicates via an air interface 103 with an access point (gNB) 104. The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is part of a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network.

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or femto cellular access point.

The access point 104 in this illustrative embodiment is operatively coupled to mobility management functions 106.

In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) may also be referred to herein, more generally, as an authentication entity. In addition, home subscriber functions may include, but are not limited to, Network Slice Selection Function (NSSF), Network Exposure Function (NEF), Network Repository Function (NRF), Policy Control Function (PCF), and Application Function (AF).

One important point to note is that in an SBA communication system, such as a 5G system, the control plane uses a services model approach in which components (NFs) query the NRF to discover and communicate with each other over application programming interfaces (APIs).

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. As is known in 5G and other communication networks, the User Plane (UP) or data plane carries network user traffic while the Control Plane (CP) carries signaling traffic. SMF 110 supports functionalities relating to UP subscriber sessions, e.g., establishment, modification and release of protocol data units (PDU) sessions. UPF 112 supports functionalities to facilitate UP operations, e.g., packet routing and forwarding, interconnection to the data network (e.g., 114 in FIG. 1), policy enforcement, and data buffering. CP functionalities will be further described below.

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of function sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
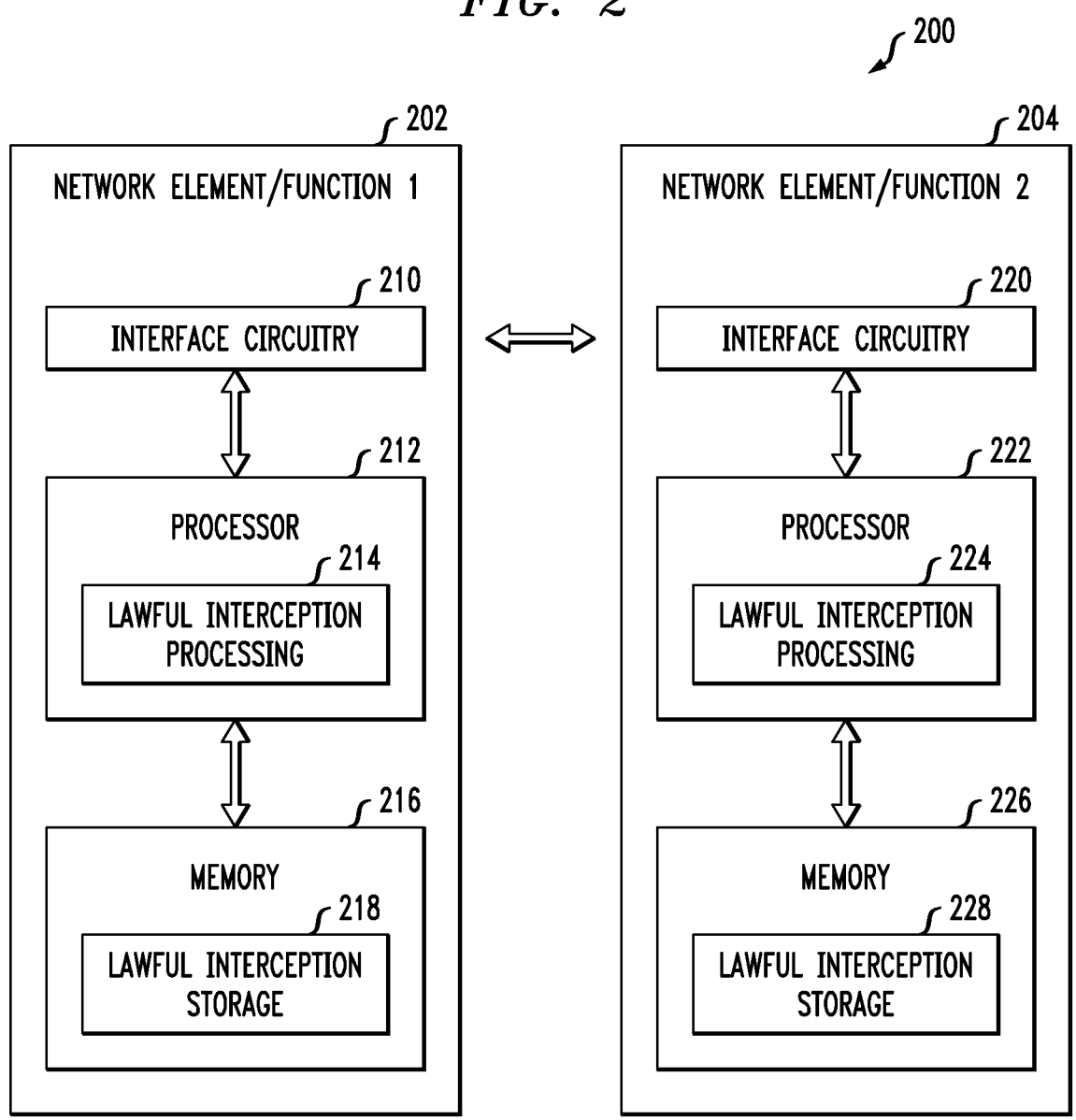
FIG. 2 illustrates network elements/functions for providing lawful interception with which one or more illustrative embodiments may be implemented.

FIG. 2 is a block diagram of network elements/functions for providing lawful interception in an illustrative embodiment. System 200 is shown comprising a first network element/function 202 and a second network element/function 204. It is to be appreciated that the network elements/functions 202 and 204 represent any of the network elements/functions mentioned above, e.g., AMF, SEAF, AUSF, UDM, NSSF, NEF, NRF, PCF, AF, SMF, UPF, that are configured to provide lawful interception and other techniques described herein.

The network element/function 202 comprises a processor 212 coupled to a memory 216 and interface circuitry 210. The processor 212 of the network element/function 202 includes a lawful interception processing module 214 that may be implemented at least in part in the form of software executed by the processor. The processing module 214 performs lawful interception described in conjunction with subsequent figures and otherwise herein. The memory 216 of the network element/function 202 includes a lawful interception storage module 218 that stores data generated or otherwise used during lawful interception operations.

The network element/function 204 comprises a processor 222 coupled to a memory 226 and interface circuitry 220. The processor 222 of the network element/function 204 includes a lawful interception processing module 224 that may be implemented at least in part in the form of software executed by the processor 222. The processing module 224 performs lawful interception described in conjunction with subsequent figures and otherwise herein. The memory 226 of the network element/function 204 includes a lawful interception storage module 228 that stores data generated or otherwise used during lawful interception operations.

The processors 212 and 222 of the respective network elements/functions 202 and 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The memories 216 and 226 of the respective network elements/functions 202 and 204 may be used to store one or more software programs that are executed by the respective processors 212 and 222 to implement at least a portion of the functionality described herein. For example, lawful interception operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective network elements/functions 202 and 204 illustratively comprise transceivers or other communication hardware or firmware that allows the associated system elements to communicate with one another in the manner described herein.

It is apparent from FIG. 2 that network element/function 202 is configured for communication with network element/function 204 and vice-versa via their respective interface circuitries 210 and 220. This communication involves network element/function 202 sending data to the network element/function 204, and the network element/function 204 sending data to the network element/function 202. However, in alternative embodiments, other network elements may be operatively coupled between the network elements/functions 202 and 204. The term "data" as used herein is intended to be construed broadly, so as to encompass any type of information that may be sent between network elements/functions (as well as between user equipment and a core network) including, but not limited to, identity data, key pairs, key indicators, authentication data, control data, audio, video, multimedia, etc.

It is to be appreciated that the particular arrangement of components shown in FIG. 2 is an example only, and numerous alternative configurations may be used in other embodiments. For example, any given network element/function can be configured to incorporate additional or alternative components and to support other communication protocols.

Other system elements such as UE 102 and gNB 104 may each also be configured to include components such as a processor, memory and network interface. These elements need not be implemented on separate stand-alone processing platforms, but could instead, for example, represent different functional portions of a single common processing platform.

Illustrative embodiments provide lawful interception architectures for 5G systems. The architecture for 5G systems is being standardized in 3GPP. The 3GPP TS 23.501 defines the 5G system architecture as service-based and the interaction between network functions is represented in two ways: (i) service-based representation; and (ii) reference-point based representation.

Figure 3:
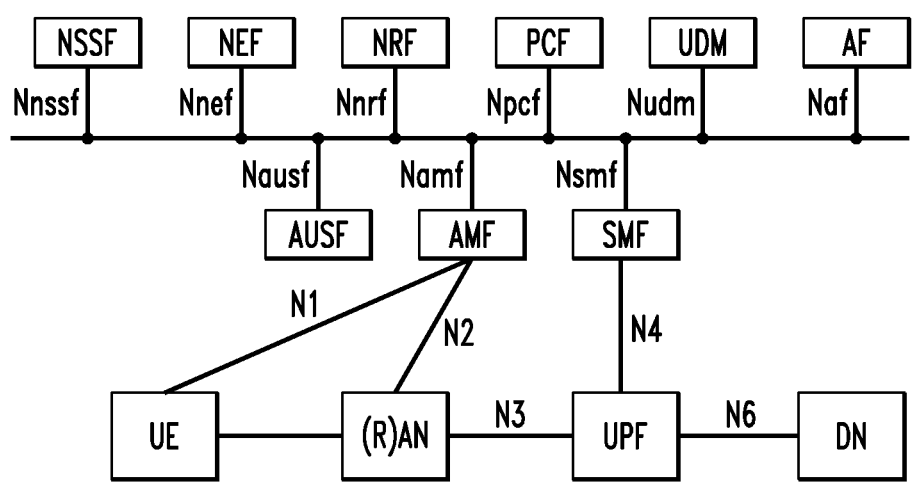
FIG. 3 illustrates a communication system architecture illustrating a service-based representation with which one or more illustrative embodiments may be implemented.
Figure 4:
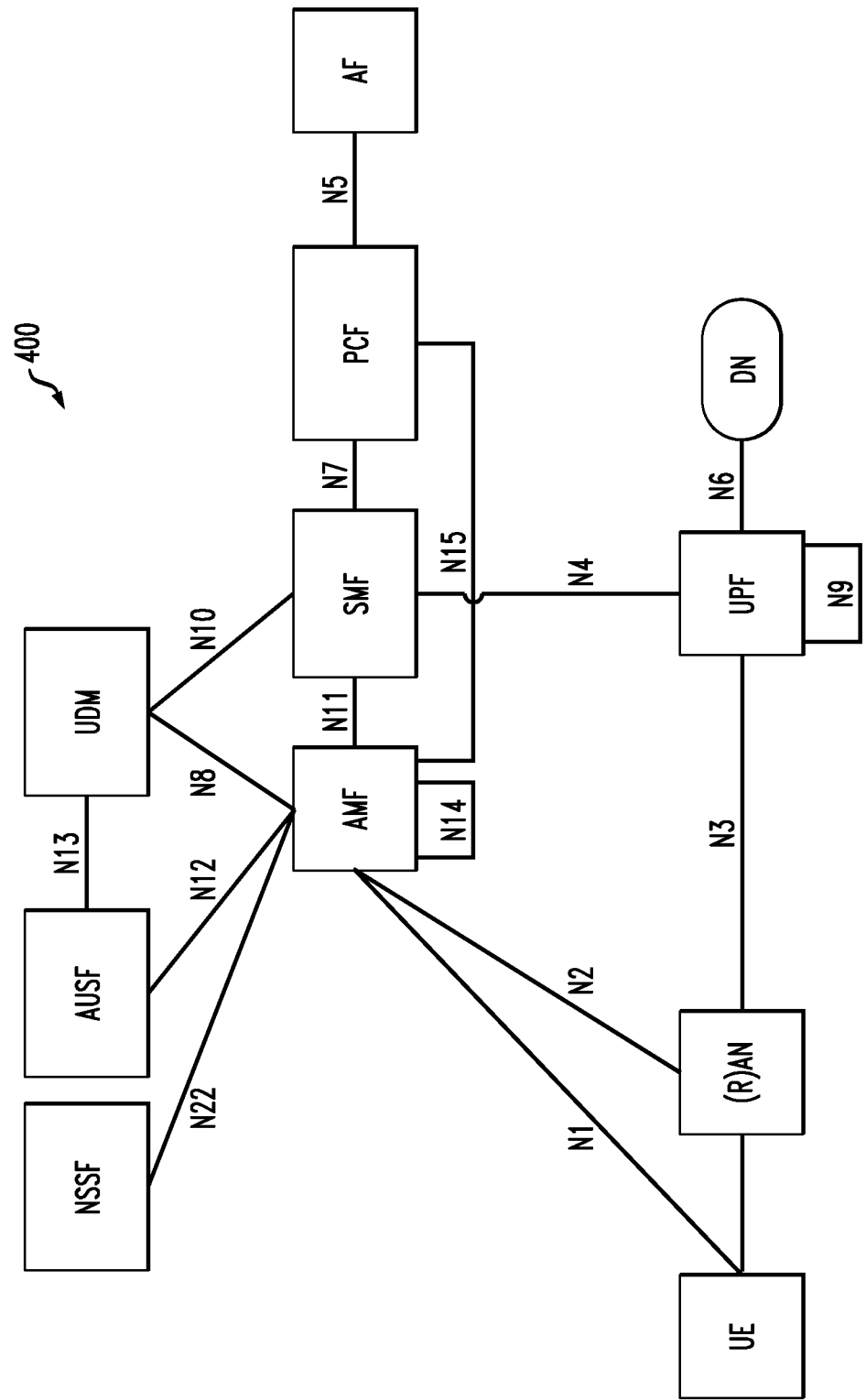
FIG. 4 illustrates a communication system architecture illustrating a reference-point based representation with which one or more illustrative embodiments may be implemented.

FIG. 3 depicts the 5G architecture 300 in a service-based representation as illustrated in TS 23.501 (FIG. 4.2.3.1). With service-based representation, the network functions within the Control Plane enable other authorized network functions to access their services. That is, the Control Plane interfaces are defined as service-based interfaces Nnssf, Nnef, Nnrf, Npcf, Nudm, Naf, Nausf, Namf, and Nsmf. Also shown is reference-point representation including point-to-point interfaces (N1, N2, N3, etc.) between NFs where necessary. A main difference between the two types of interface representation is that instead of predefined interfaces (reference-point based representation) between network functions (NFs), service-based representation uses a service model in which one NF queries the NRF to discover and enable communication between itself and one or more other NFs. TS 23.501 states that all network functions in the 5G core system shall only use service-based interfaces in the Control Plane.

FIG. 4 depicts the 5G architecture 400 in a reference-point based representation as illustrated in TS 23.501 (FIG. 4.2.3.2). As explained above, with reference-point based representation, two NFs interact using a point-to-point interface. The pre-5G systems have the point-to-point reference interfaces. The service-based interface reference helps to view the 5G system architecture in line with the network function virtualization (NFV) or software defined networks (SDNs).

Thus, by way of example, with a service-based interface, one network function/element is able to interact (communicate) with any other network function/element directly. For example, as shown in the point-to-point interface representation of FIG. 4, if for some reason SMF has to interact with the NSSF, then the information can go through AMF, whereas in the service-based interface representation of FIG. 3, the SMF can interact with the NSSF directly.

Illustrative embodiments provide for improving the LI architecture for 5G systems with service-based interfaces.

Figure 5:
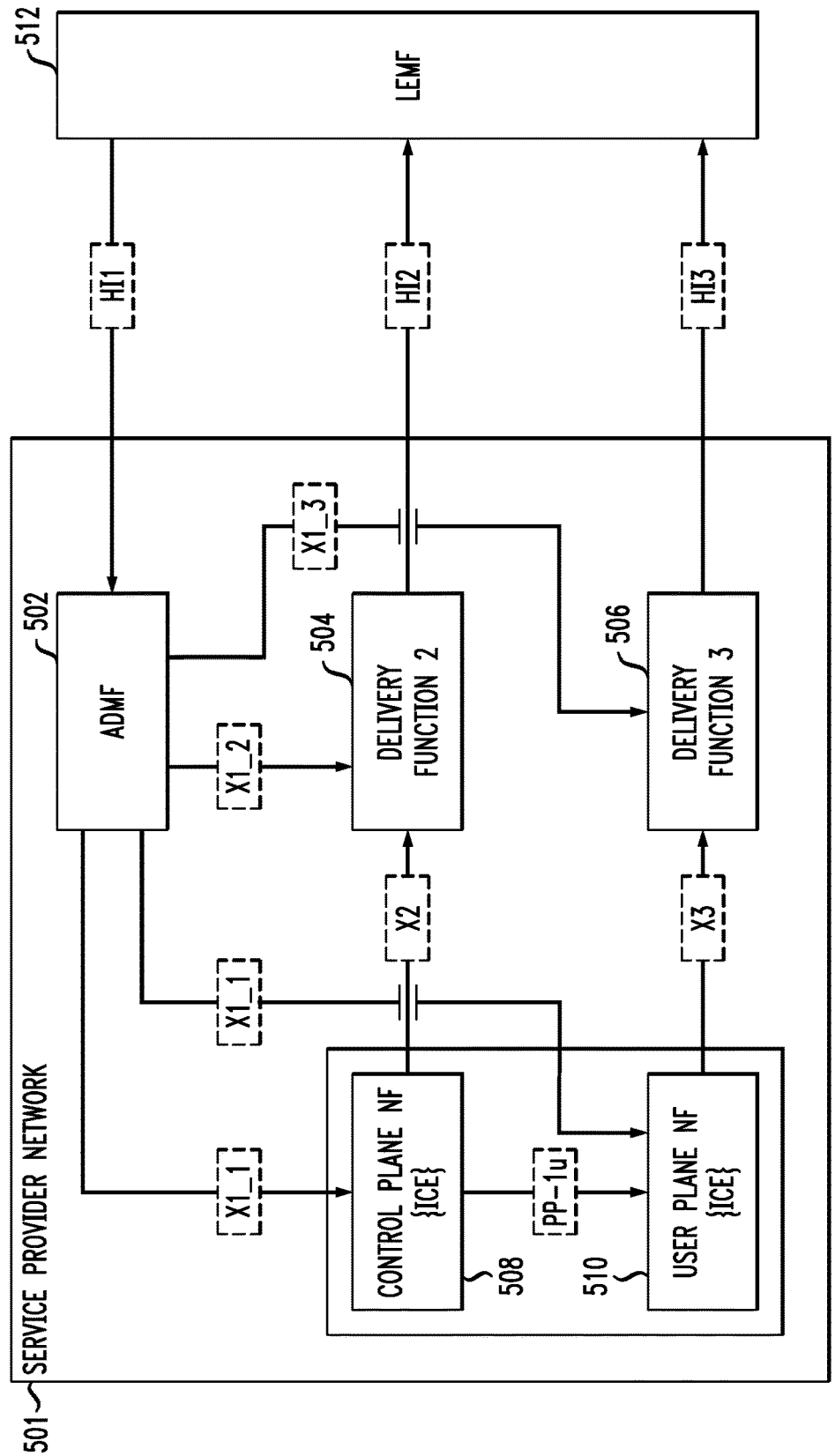
FIG. 5 illustrates lawful interception system elements with which one or more illustrative embodiments may be implemented.

The LI architecture in pre-5G systems uses point-to-point interfaces. FIG. 5 illustrates a general concept of an LI system 500.

As shown in system environment 500, with Service Provider Network 501, ADMF (Administration Function) 502, Delivery Function 2 (DF2) 504, and Delivery Function 3 (DF3) 506 are LI specific functional elements and are deployed and managed by the service provider that serves the intercept subject (also referred to as "target"). As used herein, ADMF, DF2 and DF3 are collectively referred to as LI systems or LI system functions. The ADMF, DF2 and DF3 are also examples of "lawful interception-specific elements." Control Plane Network Function (NF) 508 and User Plane Network Function (NF) 510 are the two Intercept Control Elements (ICE) that are involved in handling the communication traffic of the target. These NFs as well as others are also examples of "intercepting control elements."

As further shown, the Law Enforcement Monitoring Function (LEMF) 512 is part of a Law Enforcement Agency (LEA) that is responsible for sending an LI request (over the Handover Interface 1 or HI1) to the service provider (501) and then collecting the LI-data. LI-data consists of two parts: (1) Intercept Related Information or IRI that is derived from the signaling information (or control plane data) associated with the target's communication; and (2) Communication Content or CC that is derived from the user plane packets. Note that the terms LEMF and LEA may occasionally be used interchangeably throughout the description and figures without any loss of distinction.

ADMF 502 provisions the target information, intercept information and the delivery interface information to the ICEs 508 and 510 over the X1_1 reference point.

Note that in certain figures (i.e., FIG. 5 and others) to indicate that two lines that cross in the diagram are not intended to be operatively connected, a symbol with two parallel lines (=) is used to show that the lines are not connected (e.g., X1_1 is not connected to X2). Certain other figures use a semicircle to show non-connection (e.g., FIG. 4 with respect to the lines representing N4 and N15).

ADMF 502 also provisions the DF2 504 (over X1_2 reference point) and DF3 506 (over X1_3 reference point) with the intercept related information. The Control Plane NF 508 intercepts and delivers the IRI events associated with the target's communication to the DF2 504 over X2 reference point. The User Plane NF 510 intercepts and delivers the CC associated with the target's communication to the DF3 506 over X3 reference point. The DF2 504 delivers the IRI to the LEMF 512 over HI2. The DF3 506 delivers the CC to the LEMF 512 over HI3.

It is to be understood that illustrative embodiments described herein apply to a service provider network (e.g., 501).

Figure 6:
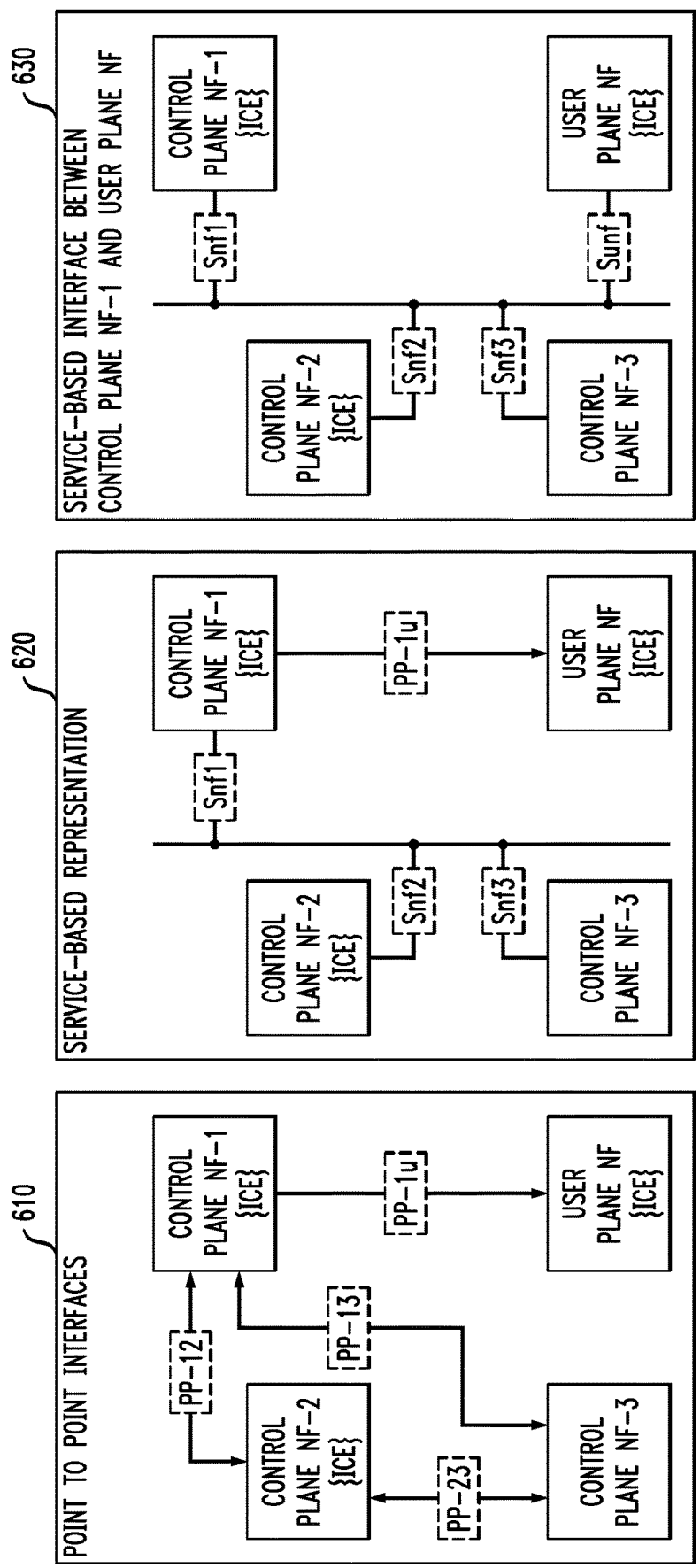
FIG. 6 illustrates network functions with which one or more illustrative embodiments may be implemented.

To explain the one or more problems and then illustrative solutions that address the problems, some hypothetical network functions are considered which are illustrated in FIG. 6. More particularly, FIG. 6 shows three control plane NFs and one User Plane NF. Of the three Control Plane NFs, only two (Control Plane NF-1 and Control Plane NF-2) are serving as ICEs. In other words, Control Plane NF-3 has no role in the interception. Control Plane NF-1 interacts with the User Plane NF. Block 610 of FIG. 6 shows the point-to-point interfaces between the NFs (e.g., PP-23 between Control NF-2 and Control NF-3) whereas block 620 shows service-based representation for Control Plane interfaces (e.g., Snf2 for Control Plane NF-2). As per 3GPP TS 23.501, the Control Plane NF (i.e., Control Plane NF-1 in FIG. 6) continues to use point-to-point interface (PP-1u) to interact with the User Plane NF, as shown in block 630 of FIG. 6. Given the above description, main problems with the existing LI system will now be described.

Figure 7:
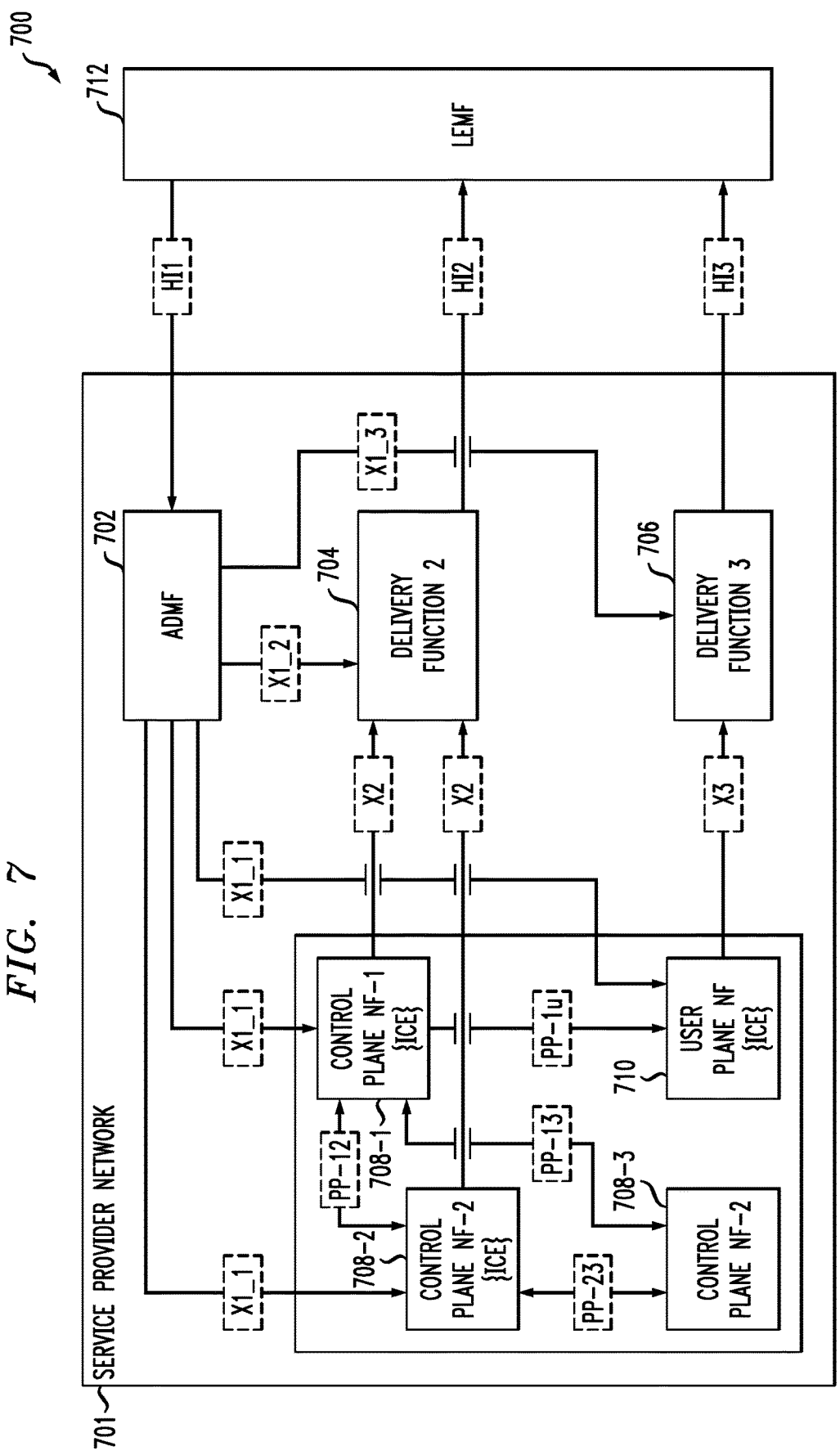
FIG. 7 illustrates a current lawful interception system with which one or more illustrative embodiments may be implemented.

In FIG. 7, system environment 700 illustrates how the LI would apply when the NFs have just point-to-point interfaces (as in pre-5G systems) between them. Note that similar to FIG. 5, Service Provider Network 701 in FIG. 7 includes ADMF 702, DF2 704, and DF3 706, which function similarly to the similarly named elements in FIG. 5. ADMF 702, DF2 704, and DF3 706 are operatively coupled to LEMF 712. Control Plane NF-1 708-1 and Control Plane NF-2 708-2 are ICEs for IRI events (Control Plane NF-3 708-3 does not function as an ICE in this example) and User Plane NF 710 is an ICE for CC. Further, as shown, the Control Plane NF-1 708-1 controls the User Plane NF 710. The NFs use point-to-point interfaces for any interactions between one another. The LI specific functions (ADMF 702, DF2 704, DF3 706) within Service Provider Network 701 also have point-to-point interfaces with the ICEs 708-1, 708-2, and 710 (X1_1, X2, X3, respectively).

Figure 8:
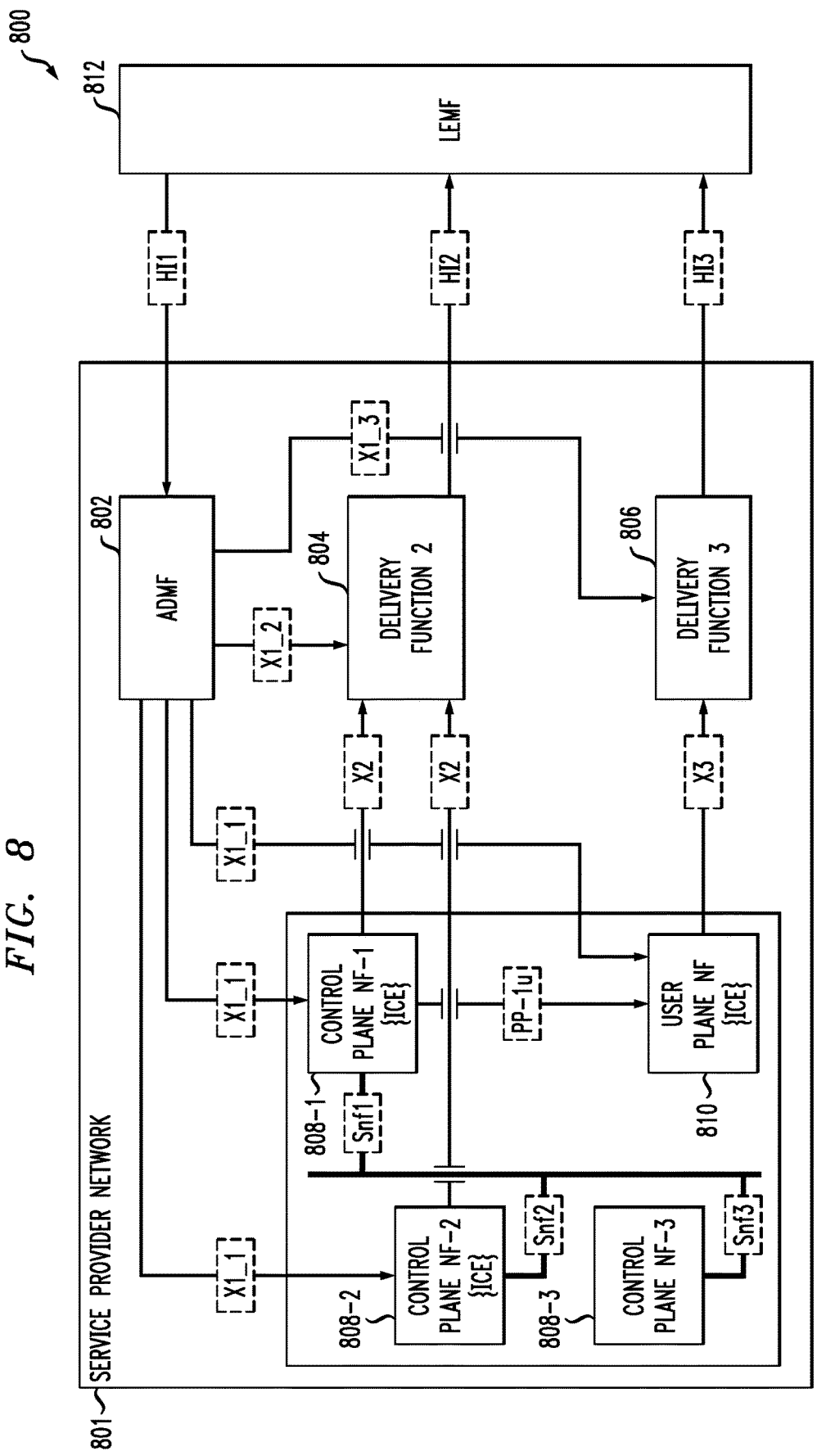
FIG. 8 illustrates application of a current lawful interception system to networks with service-based interfaces with which one or more illustrative embodiments may be implemented.

In FIG. 8, system environment 800 illustrates a current LI system in a 5G network configured with service-based representation. Note that similar to FIG. 7, Service Provider Network 801 in FIG. 8 includes ADMF 802, DF2 804, and DF3 806, which function similarly to the similarly named elements in FIG. 7. ADMF 802, DF2 804, and DF3 806 are operatively coupled to LEMF 812. Control Plane NF-1 808-1 and Control Plane NF-2 808-2 are ICEs for IRI events (Control Plane NF-3 808-3 does not function as an ICE in this example) and User Plane NF 810 is an ICE for CC. Further, as shown, the Control Plane NF-1 808-1 controls the User Plane NF. In contrast to the point-to-point interfaces in FIG. 7, the Control Plan NFs 808-1, 808-2 and 808-3 have service-based interfaces denoted as Snf1, Snf2, Snf3, respectively.

However, since the service-based interfaces are only used for the Control Plane in this example, Control Plane NF-1 808-1 still uses a point-to-point interface (PP-iu) to interact with User Plane NF 810. Also, in this example, the LI specific functions (ADMF 802, DF2 804, and DF3 806) within Service Provider Network 801 have point-to-point interfaces with the ICEs 808-1, 808-2, and 810 (X1_1, X2, X3, respectively).

It is to be appreciated that the nomenclature generally used herein for service-based interfaces includes a letter in uppercase (e.g., S, N, or L) followed by the acronym of the function in lowercase (e.g., Snf1, Sdf2, Sdmf, Nsmf, Nausf, Ldf2, Llif, etc.).

As shown in FIG. 8, a current network architecture that uses service-based interfaces for NFs still uses point-to-point interfaces with the LI systems ADMF, DF2 and DF3. This necessitates the NFs to continue to support the point-to-point interfaces for control-plane type LI information transfer.

As 5G systems evolve, it is realized herein that service providers may opt for service-based interfaces to replace the point-to-point interfaces X1_1 and X2 as shown in FIG. 8. As this happens, architectures shown in FIG. 8 will have to be changed. Existing approaches have not considered how to apply service-based interfaces to provision the ICEs and deliver the control plane related LI data using service-based interfaces.

Simply adding the service-based interfaces to the LI systems (i.e. ADMF, DF2) can make those functions more complex since those functions will not only require changes to support the new architecture but also must keep supporting the older networks that continue to use the point-to-point interfaces. So far, the standardization of LI for 5G has not reached a stage of evaluating the possible solutions to accomplish having service-based interfaces for LI. Since service-based interfaces are only considered for the control plane data, the X3 remains as point-to-point.

In summary, a main problem that illustrative embodiments solve is the provision of solutions that allow service providers to utilize service-based interfaces for lawful interception purposes.

Figure 9:
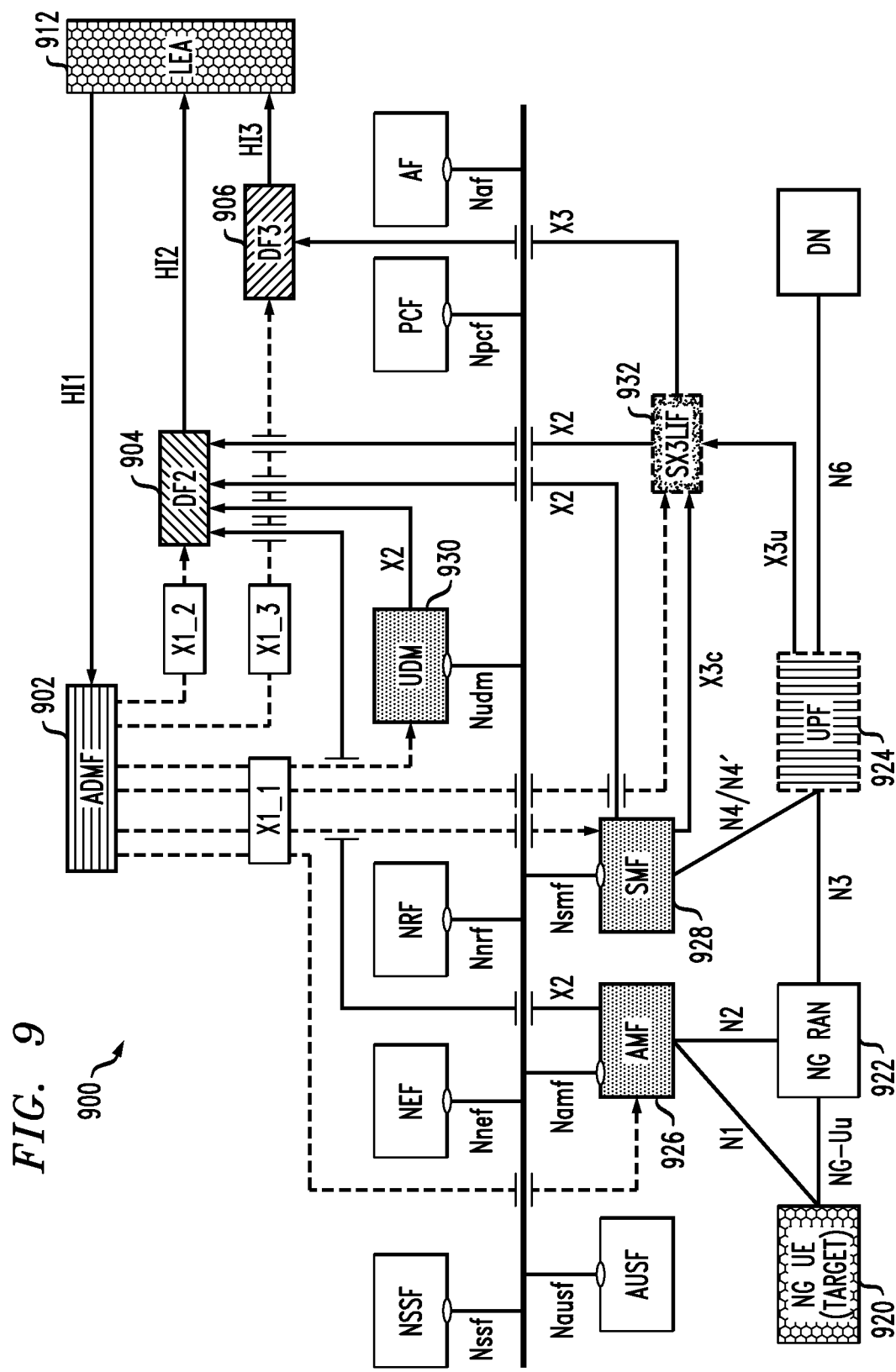
FIG. 9 illustrates a communication system with a point-to-point interface based lawful interception with which one or more illustrative embodiments may be implemented.

FIG. 9, similar in configuration to FIG. 3, shows the use of service-based interfaces at the Control Plane within the 5G Core Network between the NFs. More particularly, system architecture 900 highlights LI functions ADMF 902, DF2 904, DF3 906, and LEA 912, as well as UE 920 (which is the target of the LI operations), NG Radio Access Network (RAN) 922, UPF 924, AMF 926, SMF 928, and UDM 930. Certain NFs also have point-to-point interfaces to the NFs that handle the User Plane data (e.g., SMF 928 with UPF 924, AMF 926 with RAN 922).

In FIG. 9, AMF 926, UDM 930 and SMF 928 are the ICEs for IRI events and UPF 924 delivers the User Plane packets to a new network function shown as SX3LIF 932 (Split SX3 LI Interworking Function) introduced in the Evolved Packet Core (EPC) network to support LI for Control and User Plane Separated or CUPS model). FIG. 9 shows that AMF 926, UDM 930 and SMF 928 deliver the IRI events to DF2 904 over the point-to-point interface X2. ADMF 902 provisions AMF 926, SMF 928, UDM 930 and SX3LIF 932 via point-to-point interface X1_1. Additional ICEs may be identified. Illustrative descriptions assume these three NFs are the ICEs as they mimic the functions of MME (mobility management entity), Serving Gateway/PDN (packet data network) Gateway and HSS (home subscriber server) in the EPC network. The FIG. 9 architecture has to be changed if the desire is to replace X2 and X1_1 with service-based interfaces.

Illustrative embodiments will now be described that provide improved lawful interception architectures and methodologies using service-based interfaces.

Figure 10:
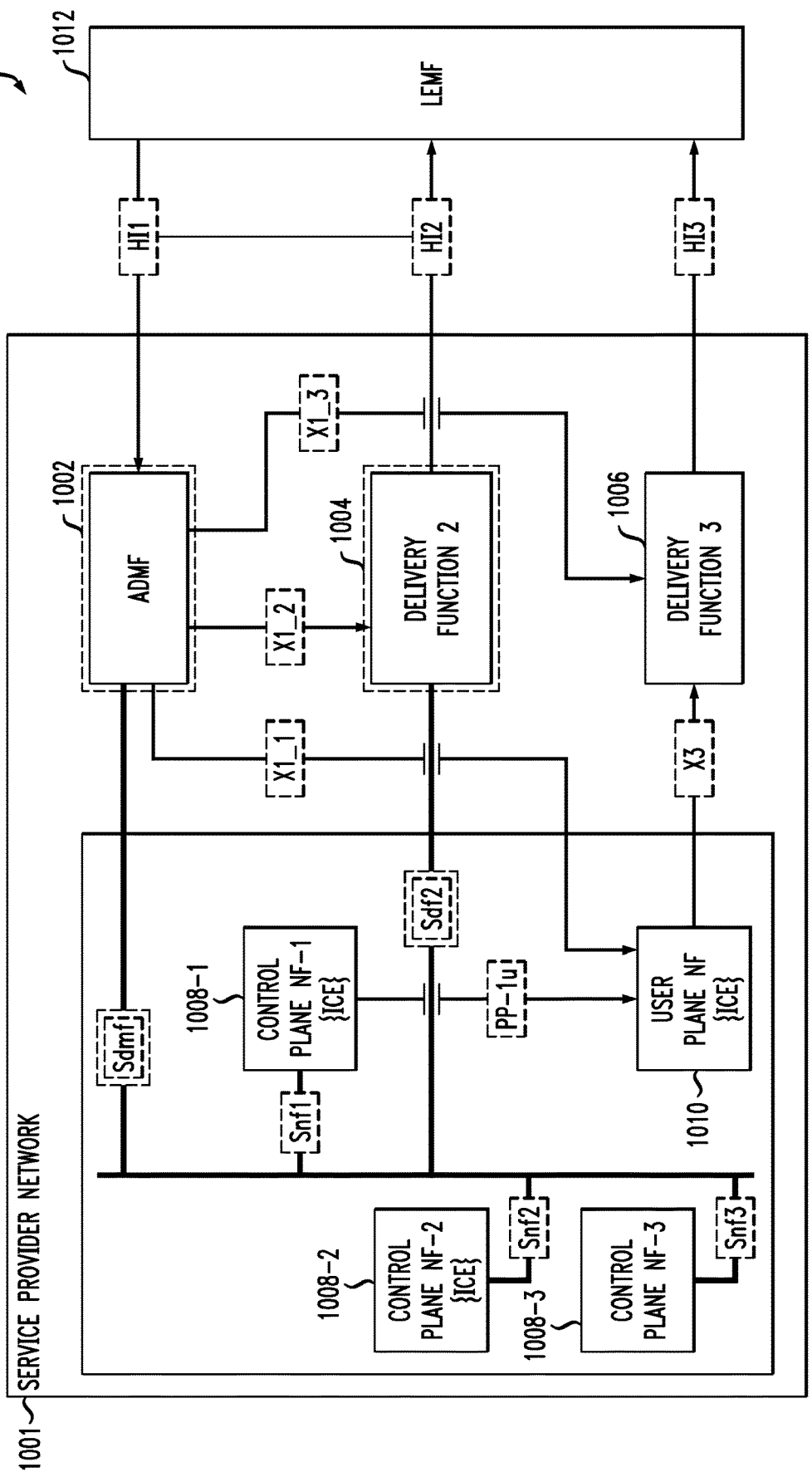
FIG. 10 illustrates a communication system with lawful interception using service-based interfaces according to an illustrative embodiment.

FIG. 10 illustrates one such illustrative embodiment. As shown in system environment 1000, Service Provider Network 1001 includes ADMF 1002, DF2 1004, and DF3 1006, which function similarly to the similarly named elements described above. ADMF 1002, DF2 1004, and DF3 1006 are operatively coupled to LEMF 1012. Control Plane NF-1 1008-1 and Control Plane NF-2 1008-2 are ICEs for IRI events (Control Plane NF-3 1008-3 does not function as an ICE in this example) and User Plane NF 1010 is an ICE for CC.

In this illustrative embodiment, ADMF 1002 and DF2 1004 are configured to have service-based interfaces. The service-based interface to ADMF 1002 is shown in FIG. 10 as Sdmf and the service-based interface to DF2 1004 is shown as Sdf2.

As in 5G network architecture (shown in FIG. 4), the LI architecture in FIG. 10 can still have reference point representation which can be as shown in FIG. 7. In that regard, the following illustrates how information flows with these service-based interfaces:

X1_1 from ADMF 1002 to Control Plane NF-1 1008-1 goes via Sdmf and Snf1.

X1_1 from ADMF 1002 to Control Plane NF-2 1008-2 goes via Sdmf and Snf2.

X2 from Control Plane NF-1 1008-1 to DF2 1004 goes via Snf1 and Sdf2.

X2 from Control Plane NF-2 1008-2 to DF2 1004 goes via Snf2 and Sdf2.

In some embodiments, e.g., FIG. 10, the information transfer of LI related data on service-based interfaces implements additional security measures to ensure that the information thus transferred is not visible to unauthorized personnel.

The User Plane NF 1010 in FIG. 10 does not have a service-based interface and, therefore, continues to use the point-to point interface for X1_1. This approach provides for enhancements to ADMF and DF2 to support service-based interfaces in addition to the point-to-point interfaces required to support the LI for pre-5G systems (that use point-to-point interfaces).

Figure 11:
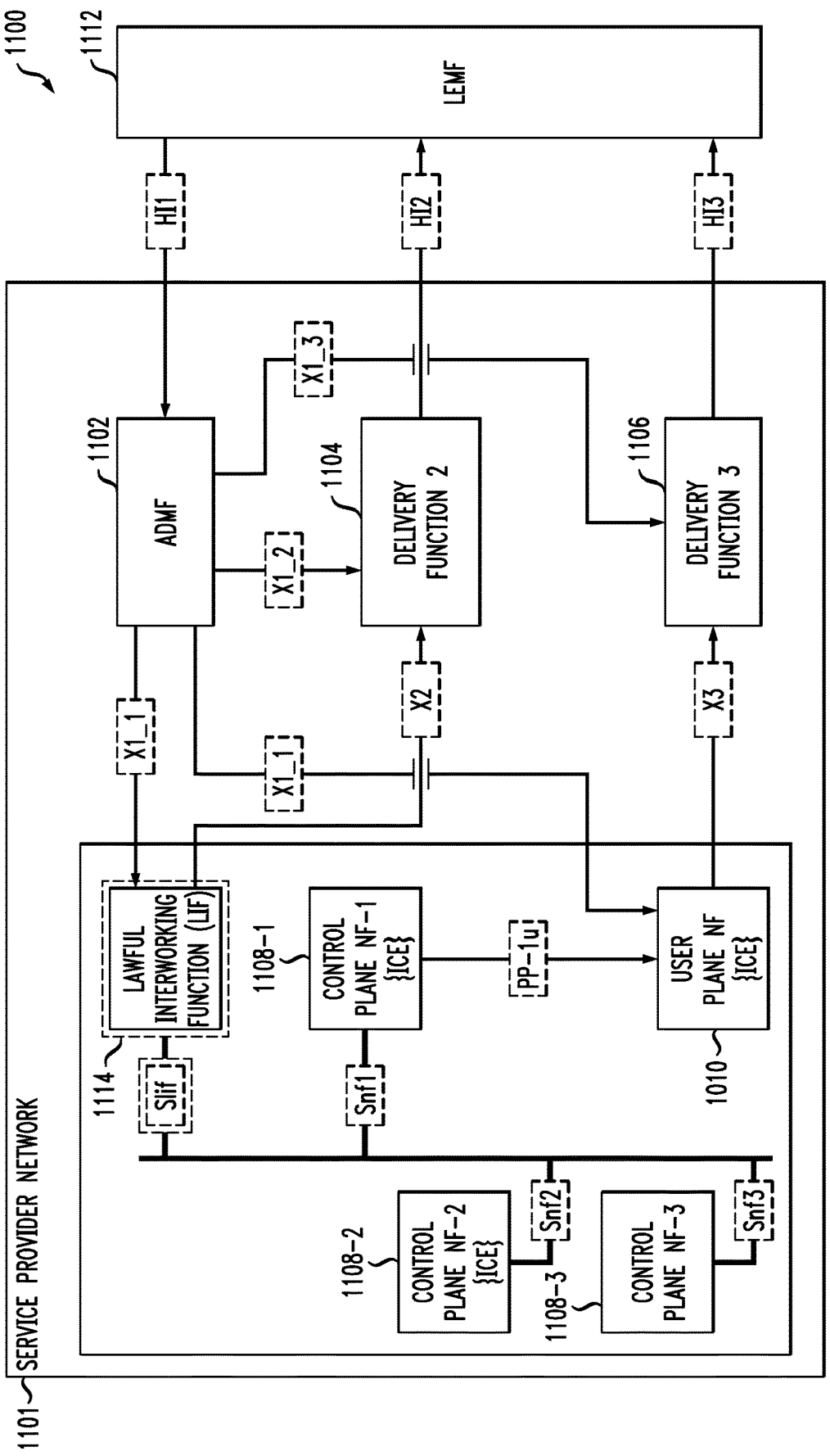
FIG. 11 illustrates a communication system with lawful interception using service-based interfaces according to an illustrative embodiment.

FIG. 11 illustrates another embodiment that employs a LI Interworking Function (LIF). As shown in system environment 1100, Service Provider Network 1101 includes ADMF 1102, DF2 1104, and DF3 1106, which function similarly to the similarly named elements described above. ADMF 1102, DF2 1104, and DF3 1106 are operatively coupled to LEMF 1112. Control Plane NF-1 1108-1 and Control Plane NF-2 1108-2 are ICEs for IRI events (Control Plane NF-3 1108-3 does not function as an ICE in this example) and User Plane NF 1110 is an ICE for CC. The new network function LIF is denoted as LIF 1114.

In this embodiment, ADMF 1102 and DF2 1104 do not require any changes. As shown in FIG. 11, the ADMF 1102 and DF2 1104 are used as they are used in the current LI system. The LIF 1114 has a service-based interface to interact with ICEs 1108-1 and 1108-2 (and 1108-3), and point-to-point interfaces to interact with ADMF 1102 and DF2 1104. The service-based interface for LIF 1114 is shown in FIG. 11 as Slif.

As in 5G network architecture (shown in FIG. 4), the LI architecture in FIG. 11 can still have reference point representation. In that regard, the following illustrates how information flows with the service-based interfaces:

X1_1 related data from LIF 1114 to Control Plane NF-1 1108-1 goes via Slif and Snf1.

X1_1 related data from LIF 1114 to Control Plane NF-2 1108-2 goes via Slif and Snf2.

X2 related data from Control Plane NF-1 1108-1 to DF2 1104 goes via Snf1 and Slif.

X2 related data from Control Plane NF-2 1108-2 to DF2 1104 goes via Snf2 and Slif.

LIF 1114 receives the X1_1 related data from ADMF 1102 and sends the data to the appropriate ICEs. In addition, LIF 1114 receives the X2 related data from the ICEs and forwards the data to DF2 1104. The information transfer of LI related data on service-based interfaces may require additional security measures to ensure that the information thus transferred is not visible to unauthorized personnel. Such measures can be implemented in this embodiment. The User Plane NF 1110 does not have a service-based interface and, therefore, continues to use the point-to point interface for X1_1. This approach does not require any changes to ADMF 1102 and DF2 1104 and thus makes it easier to have a backward compatible LI system.

Illustrative embodiments are now described that accommodate possible 5G system architecture changes.

Figure 12:
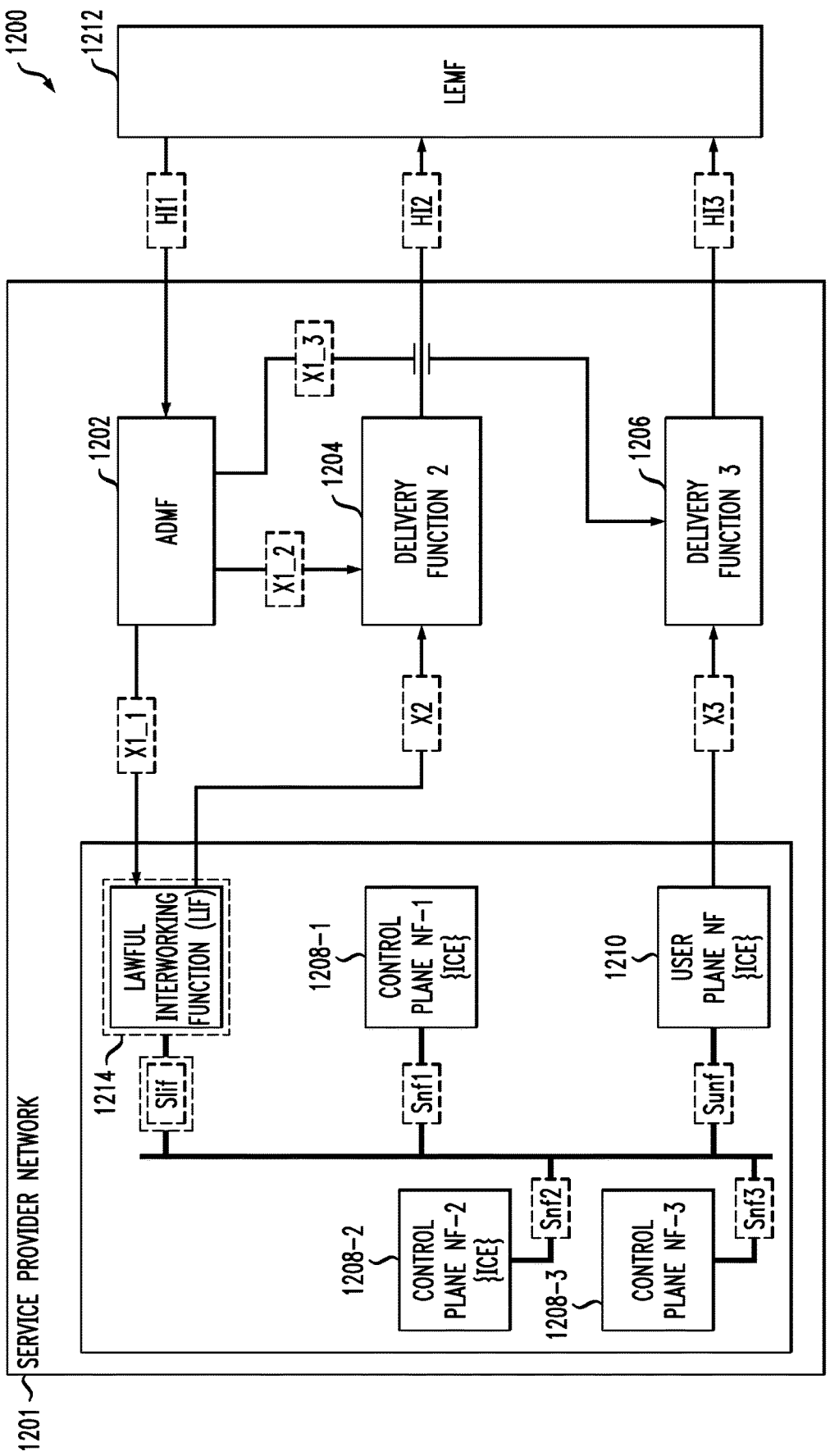
FIG. 12 illustrates a communication system with lawful interception using service-based interfaces according to an illustrative embodiment.

In the event 5G system architecture is enhanced to have a service-based interface to represent the reference point N4 (see FIG. 3), illustrative embodiments are provided to support such changes. Recall that block 630 of FIG. 6 shows the yet to be made, but possible, future enhancement of having a service-based interface between the User Plane function and Control Plane function that it interacts with. FIG. 12 is an illustrative embodiment that builds on the embodiment of FIG. 11 that addresses this architecture change.

As shown in system environment 1200, Service Provider Network 1201 includes ADMF 1202, DF2 1204, and DF3 1206, which function similarly to the similarly named elements described above. ADMF 1202, DF2 1204, and DF3 1206 are operatively coupled to LEMF 1212. Control Plane NF-1 1208-1 and Control Plane NF-2 1208-2 are ICEs for IRI events (Control Plane NF-3 1208-3 does not function as an ICE in this example) and User Plane NF 1210 is an ICE for CC. The new network function LIF is denoted as LIF 1214.

In this embodiment, User Plane NF 1210 has a service-based interface (for Control Plane data transfer) and, as such, the point-to-point interface for X1_1 between ADMF 1202 and User Plane NF 1210 is eliminated. The service-based interface to User Plane NF 1210 is denoted in FIG. 12 as Sunf. However, the User Plane data (i.e., CC) continues to be delivered via the point-to-point interface X2 from User Plane NF 1210 to DF3 1206.

As in the 5G network architecture shown in FIG. 4, the LI architecture in FIG. 12 can still have reference-point based representation. In that regard, the following illustrates how information flows with this service-based interfaces:

X1_1 related data from LIF 1214 to Control Plane NF-1 1208-1 goes via Slif and Snf1.

X1_1 related data from LIF 1214 to Control Plane NF-2 1208-2 goes via Slif and Snf2.

X1_1 related data from LIF 1214 to User Plane NF 1210 goes via Slif and Sunf.

X2 related data from Control Plane NF-1 1208-1 to DF2 1204 goes via Snf1 and Slif.

X2 related data from Control Plane NF-2 1208-2 to DF2 1204 goes via Snf2 and Slif.

N4 related data between Control Plane NF-1 1208-1 and User Plane NF 1210 goes via Snf1 and Sunf.

LIF 1214 receives the X1_1 related data from ADMF 1202 and sends the data to the appropriate ICEs. In addition, LIF 1214 receives the X2 related data from the ICEs and forwards the data to DF2 1204. The information transfer of LI related data on service-based interfaces may require additional security measures to ensure that the information thus transferred is not visible to unauthorized personnel. Such measures can be implemented in this embodiment. Advantageously, as in the embodiment of FIG. 11, the embodiment in FIG. 12 does not require any changes to ADMF 1202 and DF2 1204 and that makes it easier to have a backward compatible the LI system.

Figure 13:
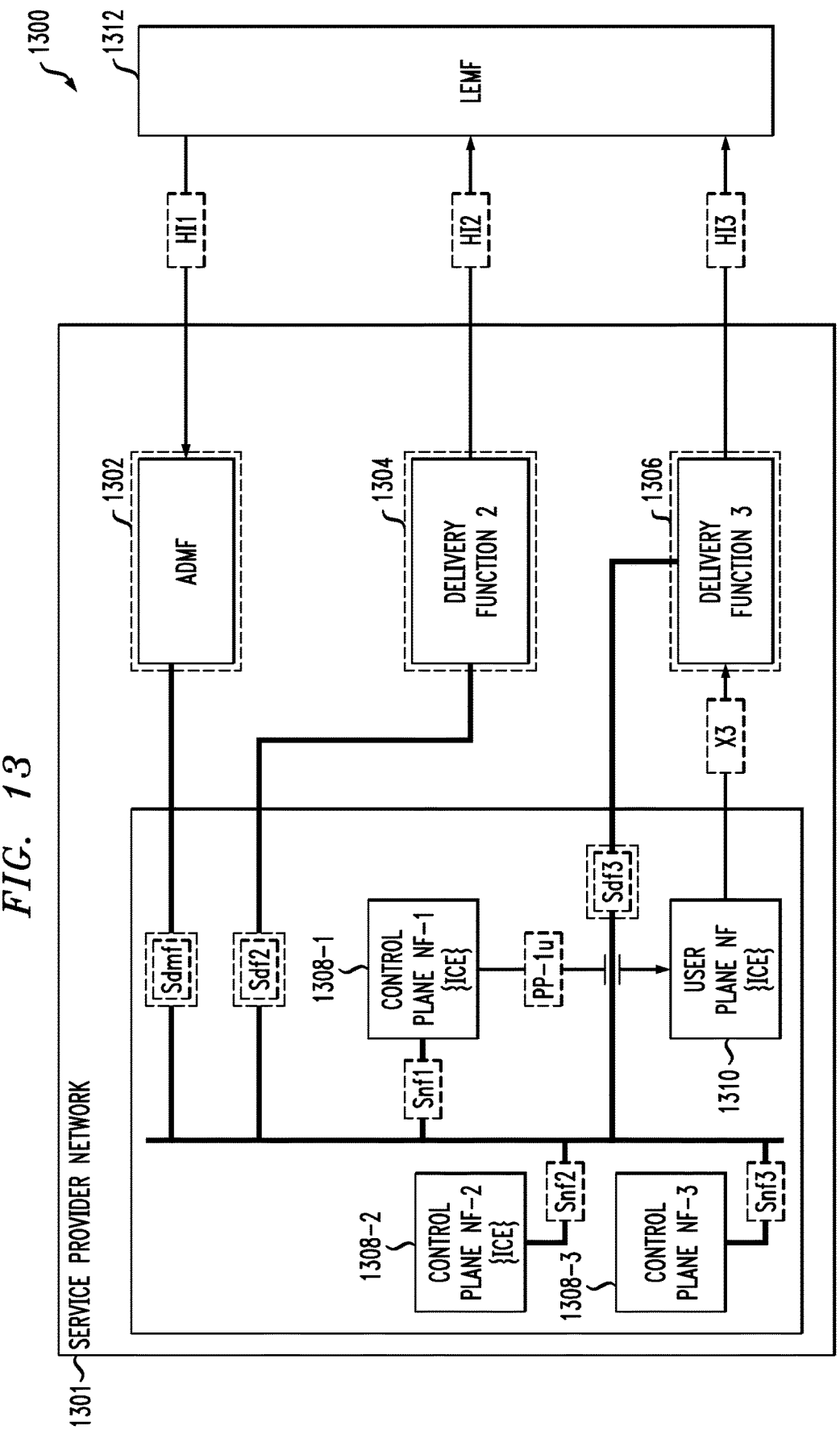
FIG. 13 illustrates a communication system with lawful interception using service-based interfaces according to an illustrative embodiment.

FIG. 13 depicts an illustrative embodiment that addresses service providers deciding to upgrade their LI systems (ADMF, DF2 and DF3) to additionally (additionally because they still have to have point-to-point interfaces to support pre-5G systems) have service-based interfaces.

As shown in system environment 1300, Service Provider Network 1301 includes ADMF 1302, DF2 1304, and DF3 1306, which function similarly to the similarly named elements described above. ADMF 1302, DF2 1304, and DF3 1306 are operatively coupled to LEMF 1312. Control Plane NF-1 1308-1 and Control Plane NF-2 1308-2 are ICEs for IRI events (Control Plane NF-3 1308-3 does not function as an ICE in this example) and User Plane NF 1310 is an ICE for CC.

More particularly, in FIG. 13, ADMF 1302, DF2 1304 and DF3 1306 are enhanced to additionally support service-based interfaces. In this embodiment, it is assumed that the User Plane NF 1310 uses point-to-point interface (PP-1u) to interact with the Control Plane NF-1 1308-1. The service-based interface to ADMF 1302 is denoted as Sdmf. The service-based interface to DF2 1304 is denoted as Sdf2. The service-based interface to DF3 1306 is denoted as Sdf3. LIF is not used in this embodiment since LI functions themselves are configured to have service-based interfaces. From that perspective, this may be considered as an extension of the concept illustrated in FIG. 10.

As in the 5G network architecture (shown in FIG. 4), the LI architecture in FIG. 13 can still have reference-point based representation. In that regard, the following illustrates how information flows with this service-based interfaces:

X1_1 related data from ADMF 1302 to Control Plane NF-1 1308-1 goes via Sdmf and Snf1.

X1_1 related data from ADMF 1302 to Control Plane NF-2 1308-2 goes via Sdmf and Snf2.

X1_2 related data from ADMF 1302 to DF2 1308-2 goes via Sdmf and Sdf2.

X1_3 related data from ADMF 1302 to DF3 1306 goes via Sdmf and Sdf3.

X2 related data from Control Plane NF-1 1308-1 to DF2 1304 goes via Snf1 and Sdf2.

X2 related data from Control Plane NF-2 1308-2 to DF2 1304 goes via Snf2 and Sdf2.

The User Plane data (i.e., CC) continues to be delivered via the point-to-point interface X2 from User Plane NF 1310 to DF3 1306. The information transfer of LI related data on service-based interfaces may require additional security measures to ensure that the information thus transferred is not visible to unauthorized personnel. Such measures can be implemented in this embodiment.

As mentioned above in the context of the embodiment of FIG. 10, the LI system functions in FIG. 13 will have to continue to support the point-to-point interfaces to interact with the legacy (e.g. pre-5G) systems.

Thus, to summarize, FIG. 10 presents an approach where ADMF and DF2 are enhanced to have a service-based interface, but are still required to support the point-to-point interface to deal with the legacy pre-5G systems. However, service providers may decide to upgrade ADMF and DF2 considering the other enhancements being made in their networks. FIG. 11 presents an approach that introduces the new function LIF and in this approach the ADMF and DF2 do not require the enhancements and hence, backward compatibility with the pre-5G systems is easier. The term "no enhancement" means no functional enhancement. Enhancements such as modifying the messages to communicate with the new function LIF are needed.

FIG. 12 enhances the concept presented in FIG. 11 to cover any further enhancements that may be made in the future versions of 5G system architecture.

FIG. 13 presents an approach where LI systems (ADMF, DF2 and DF3) are also enhanced to have service-based interface. This is a further enhancement to the approach described in the context of FIG. 10.

Illustrative embodiments are now described that address backward compatibility.

Figure 14:
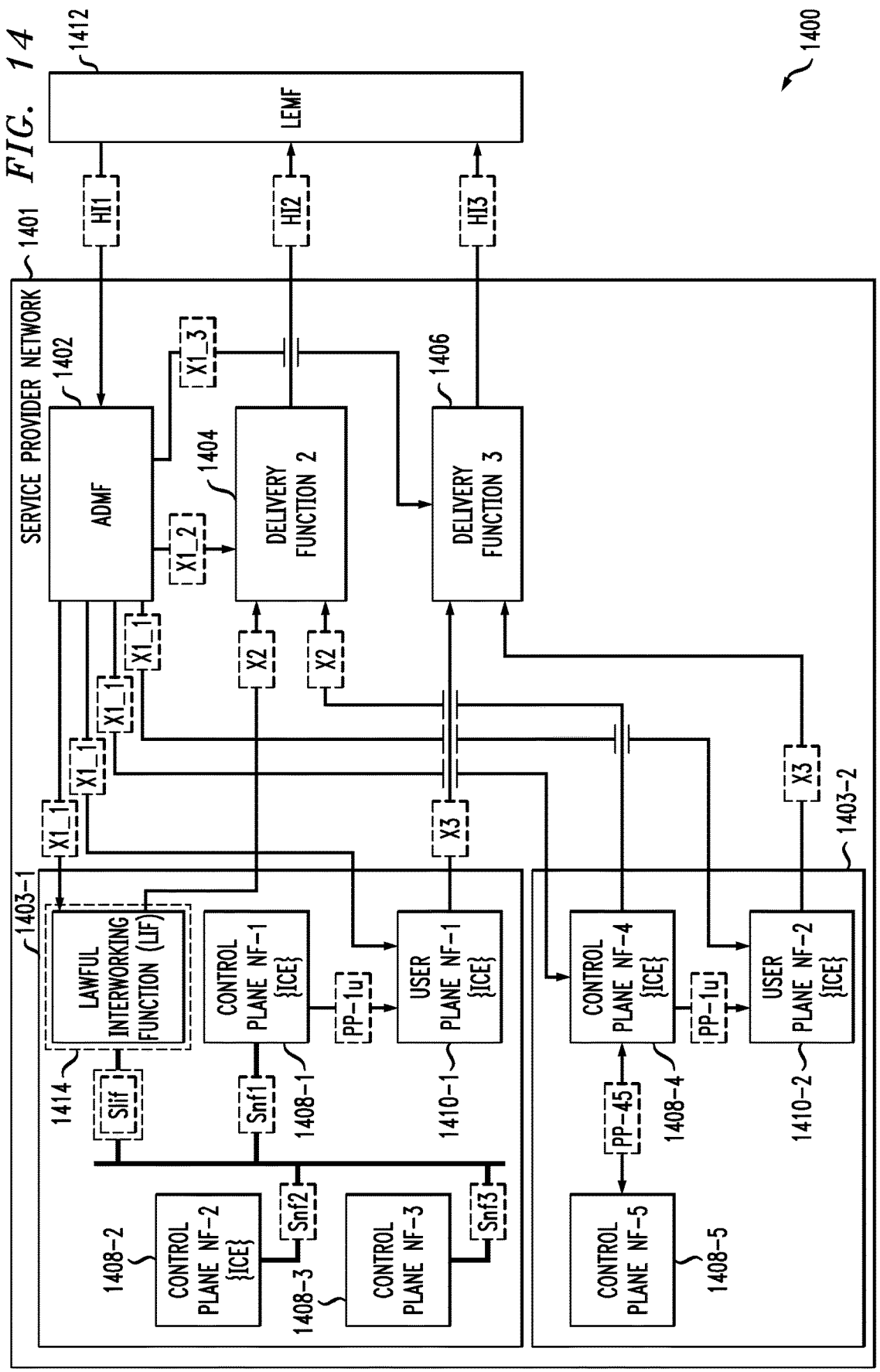
FIG. 14 illustrates a communication system with lawful interception using service-based interfaces according to an illustrative embodiment.

FIG. 14 illustrates how the LI systems can support systems that have service-based interfaces and the systems that have point-to-interfaces. Note that the FIG. 11 embodiment is used as a basis for FIG. 14.

As shown in system environment 1400, Service Provider Network 1401 includes ADMF 1402, DF2 1404, and DF3 1406, which function similarly to the similarly named elements described above. ADMF 1402, DF2 1404, and DF3 1406 are operatively coupled to LEMF 1412. Control Plane NF-1 1408-1 and Control Plane NF-2 1408-2 are ICEs for IRI events (Control Plane NF-3 1408-3 does not function as an ICE in this example) and User Plane NF 1410-1 is an ICE for CC. The new network function LIF is denoted as LIF 1414.

Further as shown in FIG. 14, Control Plane NF-4 1408-4, Control Plane NF-5 1408-5, and User Plane NF-2 1410-2 are part of a system that has point-to-point interfaces (e.g., pre-5G). The embodiment in FIG. 14 provides that that ADMF 1402 can provision the LI data for systems that have service-based interfaces (denoted as 1403-1) and systems that have point-to-point interfaces (denoted as 1403-2). Likewise, the DF2 1404 can receive the X2 related data from the systems that have service-based interfaces (1403-1) and point-to-point interfaces (1403-2).

Figure 15:
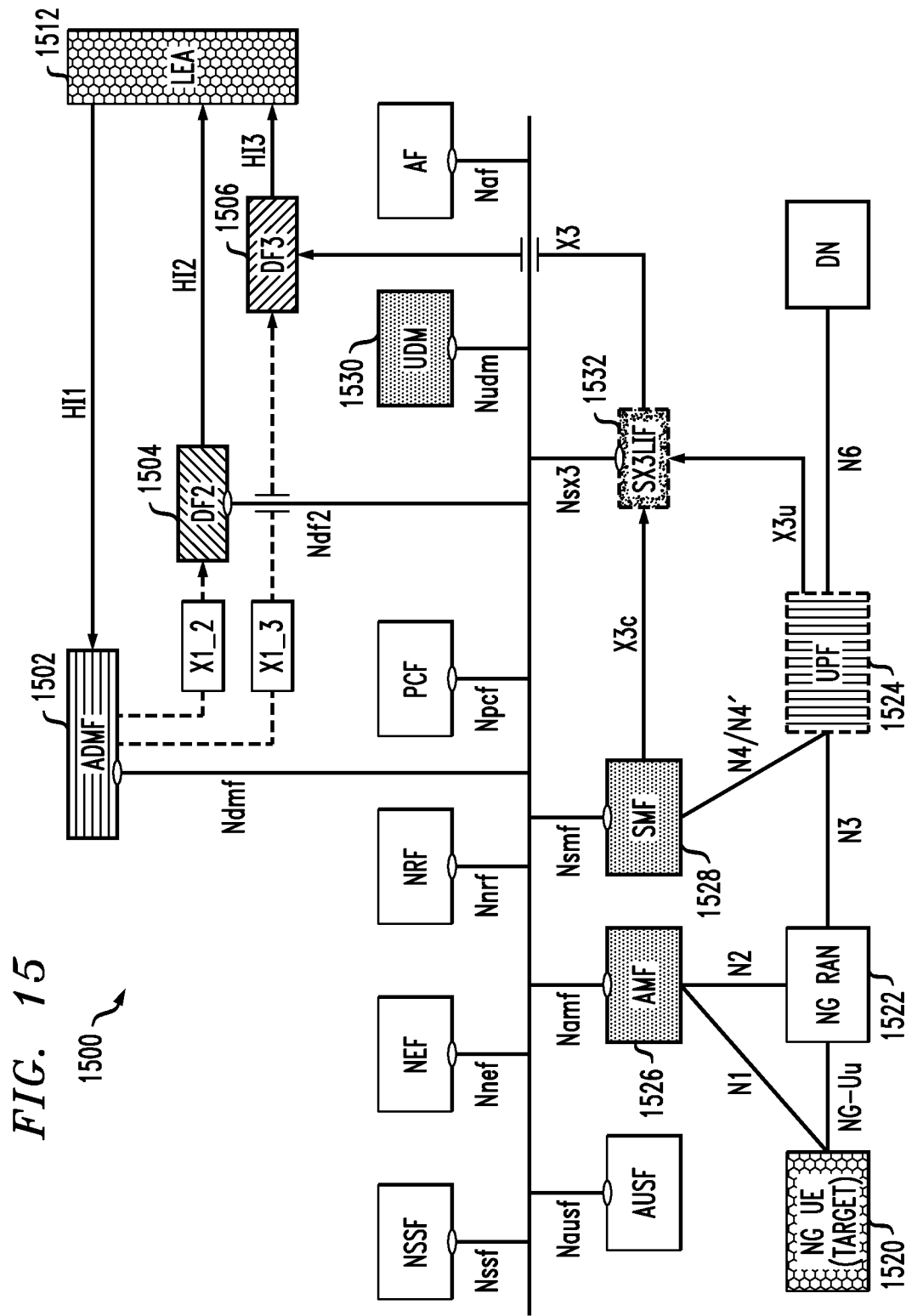
FIG. 15 illustrates a communication system with lawful interception using service-based interfaces according to an illustrative embodiment.

FIG. 15 illustrates the application of the approach from FIG. 10 to the 5G systems architecture shown in FIG. 3 (enhancements to FIG. 9). More particularly, system architecture 1500 highlights LI functions ADMF 1502, DF2 1504, DF3 1506, and LEA 1512, as well as UE 1520 (which is the target of the LI operations), NG RAN 1522, UPF 1524, AMF 1526, SMF 1528, UDM 1530, and SX3LIF 1532.

In this embodiment, ADMF 1502 and DF2 1504 are enhanced to have service-based interfaces. They still support the point-to-point interface to interact with the legacy (e.g., pre-5G) systems that use point-to-point interfaces. In FIG. 15, AMF 1526, SMF 1528, UDM 1530, and in some situations SX3LIF 1532, generate the IRI events and deliver them to DF2 1504 using service-based interfaces. UPF 1524 duplicates the packets and delivers them to the SX3LIF 1532 which in turn delivers the CC via the X3 reference point (point-to-point) to DF3 1506. ADMF 1502 provisions AMF 1526, SMF 1528, UDM 1530 and SX3LIF 1532 using service-based interfaces. ADMF 1502 provisions DF2 1504 and DF3 1506 with the LI data via point-to-point interfaces, X1_2 and X1_3, respectively. In some embodiments, the X3c interface used to transfer intercept related information from SMF 1528 to SX3LIF 1532 is eliminated in favor of via a service-based interface (i.e., via Nsmf and Nsx3).

Figure 16:
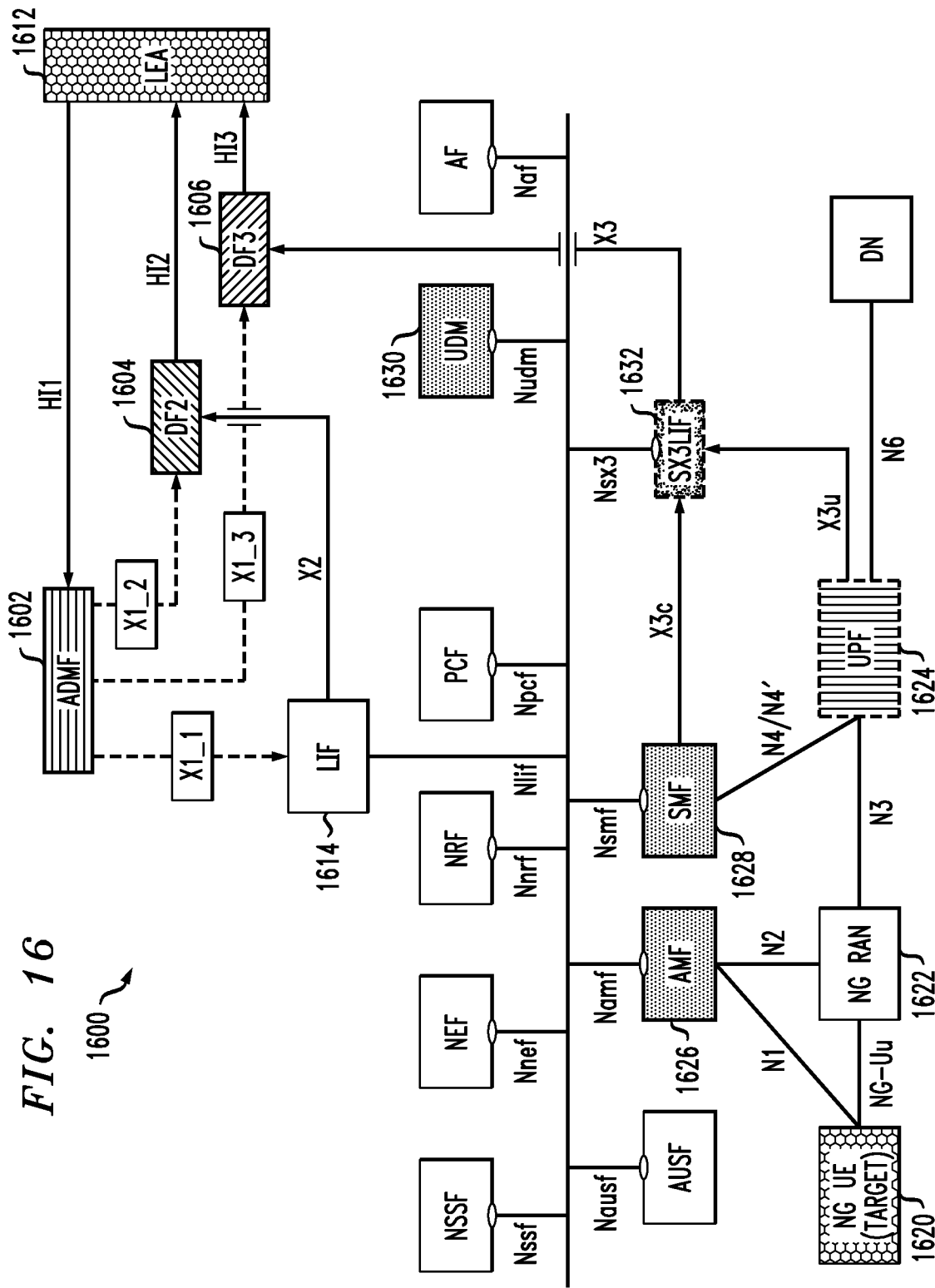
FIG. 16 illustrates a communication system with lawful interception using service-based interfaces according to an illustrative embodiment.

FIG. 16 illustrates the application of the approach from FIG. 11 to the 5G systems architecture shown in FIG. 3 (enhancements to FIG. 9). More particularly, system architecture 1600 highlights LI functions ADMF 1602, DF2 1604, DF3 1606, and LEA 1612, as well as UE 1620 (which is the target of the LI operations), NG RAN 1622, UPF 1624, AMF 1626, SMF 1628, UDM 1630, and SX3LIF 1632. In this embodiment, note also that the LI specific function LIF 1614 is added to the system. This enables the LI system functions to simultaneously support the legacy (e.g., pre-5G) systems that use point-to-point interfaces.

In FIG. 16, AMF 1626, SMF 1628, UDM 1630, and in some situations SX3LIF 1632, generate the IRI events and deliver them to DF2 1604 via LIF 1614. UPF 1624 duplicates the packets and delivers them to SX3LIF 1632 which in turn delivers the CC via the X3 reference point (point-to-point) to DF3 1606. ADMF 1602 provisions AMF 1626, SMF 1628, UDM 1630 and SX3LIF 1632 with the LI data via LIF 1614. In some embodiments, the X3c interface used to transfer intercept related information from SMF 1628 to SX3LIF 1632 is eliminated in favor of via a service-based interface (i.e., via Nsmf and Nsx3).

Figure 17:
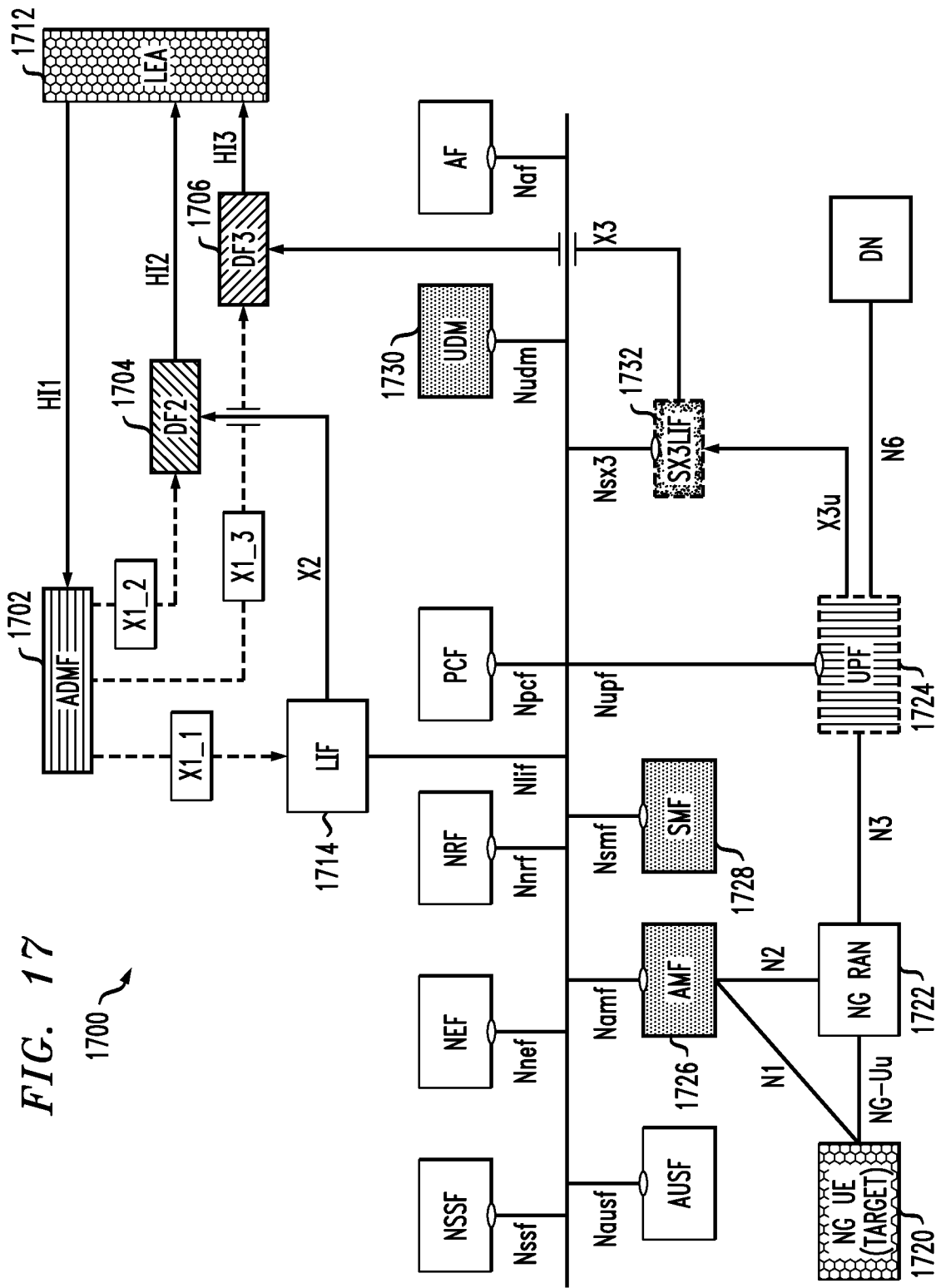
FIG. 17 illustrates a communication system with lawful interception using service-based interfaces according to an illustrative embodiment.

FIG. 17 illustrates the application of the approach from FIG. 12 to the 5G systems architecture shown in FIG. 3 (enhancements to FIG. 9). More particularly, system architecture 1700 highlights LI functions ADMF 1702, DF2 1704, DF3 1706, and LEA 1712, as well as UE 1720 (which is the target of the LI operations), NG RAN 1722, UPF 1724, AMF 1726, SMF 1728, UDM 1730, and SX3LIF 1732. In this embodiment, note also that the LI specific function LIF 1714 is added to the system. This enables the LI system functions to simultaneously support the legacy (e.g., pre-5G) systems that use point-to-point interfaces.

In FIG. 17, AMF 1726, SMF 1728, UDM 1730, and in some situations SX3LIF 1732, generate the IRI events and deliver them to DF2 1704 via LIF 1714. UPF 1724 duplicates the packets and delivers them to the SX3LIF 1732 which in turn delivers the CC via the X3 reference point (point-to-point) to DF3 1706. ADMF 1702 provisions AMF 1726, SMF 1728, UDM 1730 and SX3LIF 1732 with the LI data via LIF 1714. SMF 1728 sends the intercept information to UPF 1724 using a service-based interface. UPF 1724 has a service-based interface to interact with SMF 1728. SX3LIF 1732 also used a service-based interface to interact with SMF 1732.

Figure 18:
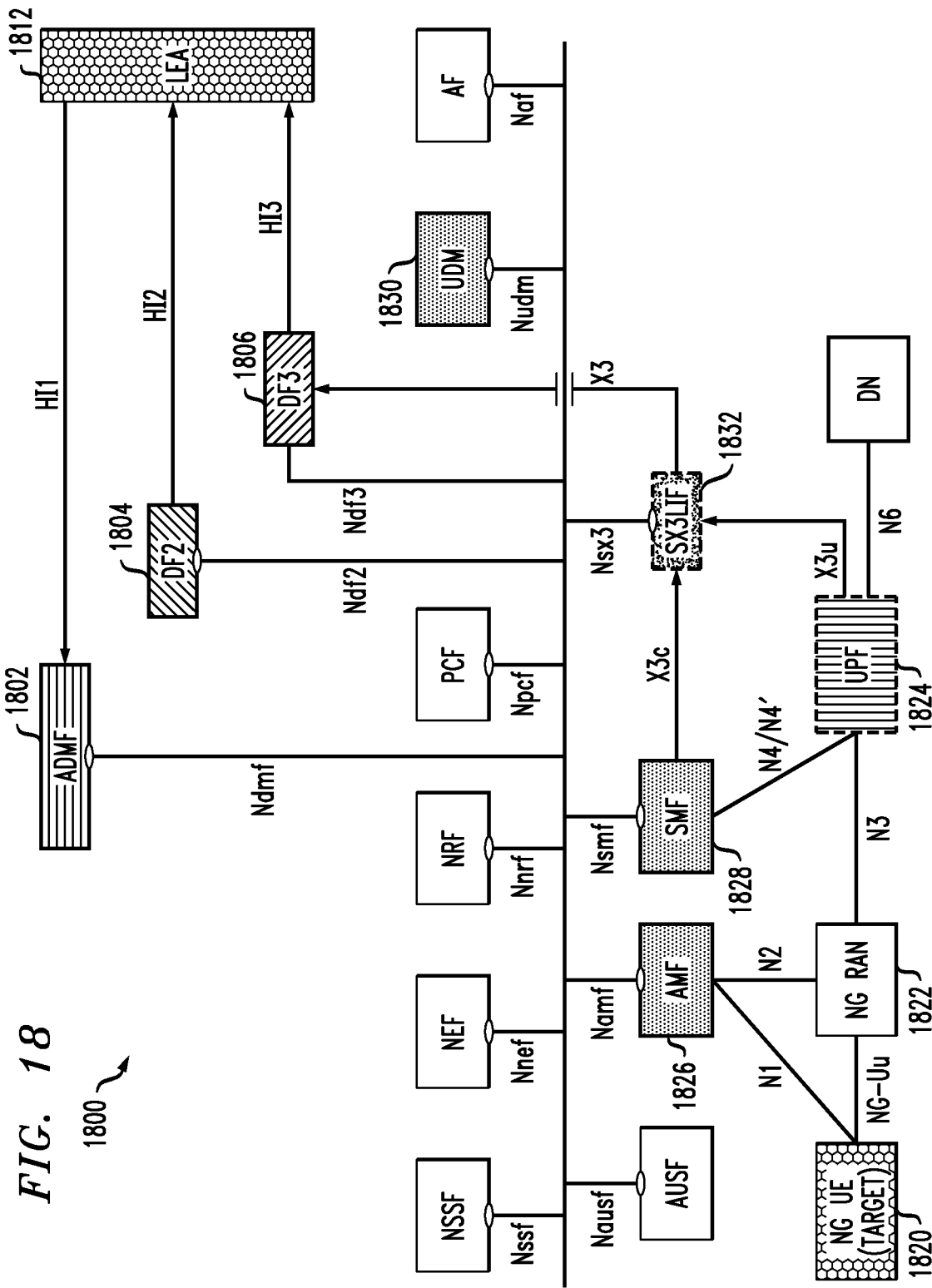
FIG. 18 illustrates a communication system with lawful interception using service-based interfaces according to an illustrative embodiment.

FIG. 18 illustrates the application of the approach from FIG. 13 to the 5G systems architecture shown in FIG. 3 (enhancements to FIG. 9). More particularly, system architecture 1800 highlights LI functions ADMF 1802, DF2 1804, DF3 1806, and LEA 1812, as well as UE 1820 (which is the target of the LI operations), NG RAN 1822, UPF 1824, AMF 1826, SMF 1828, UDM 1830, and SX3LIF 1832. In this embodiment, ADMF 1802, DF2 1804 and DF3 1806 are enhanced to have service-based interfaces. They still support the point-to-point interface to interact with the legacy (e.g., pre-5G) systems that use point-to-point interfaces.

In FIG. 18, AMF 1826, SMF 1828, UDM 1830, and in some situations SX3LIF 1832, generate the IRI events and deliver them to DF3 1806 using a service-based interface. UPF 1824 duplicates the packets and delivers them to SX3LIF 1832 which in turn delivers the CC via the X3 reference point (point-to-point) to DF3 1806. ADMF 1802 provisions AMF 1826, SMF 1828, UDM 1830, SX3LIF 1832, DF2 1804 and DF3 1806 using a service-based interface. In some embodiments, the X3c interface used to transfer intercept related information from SMF 1828 to SX3LIF 1832 is eliminated in favor of via a service-based interface (i.e., via Nsmf and Nsx3).

Figure 19:
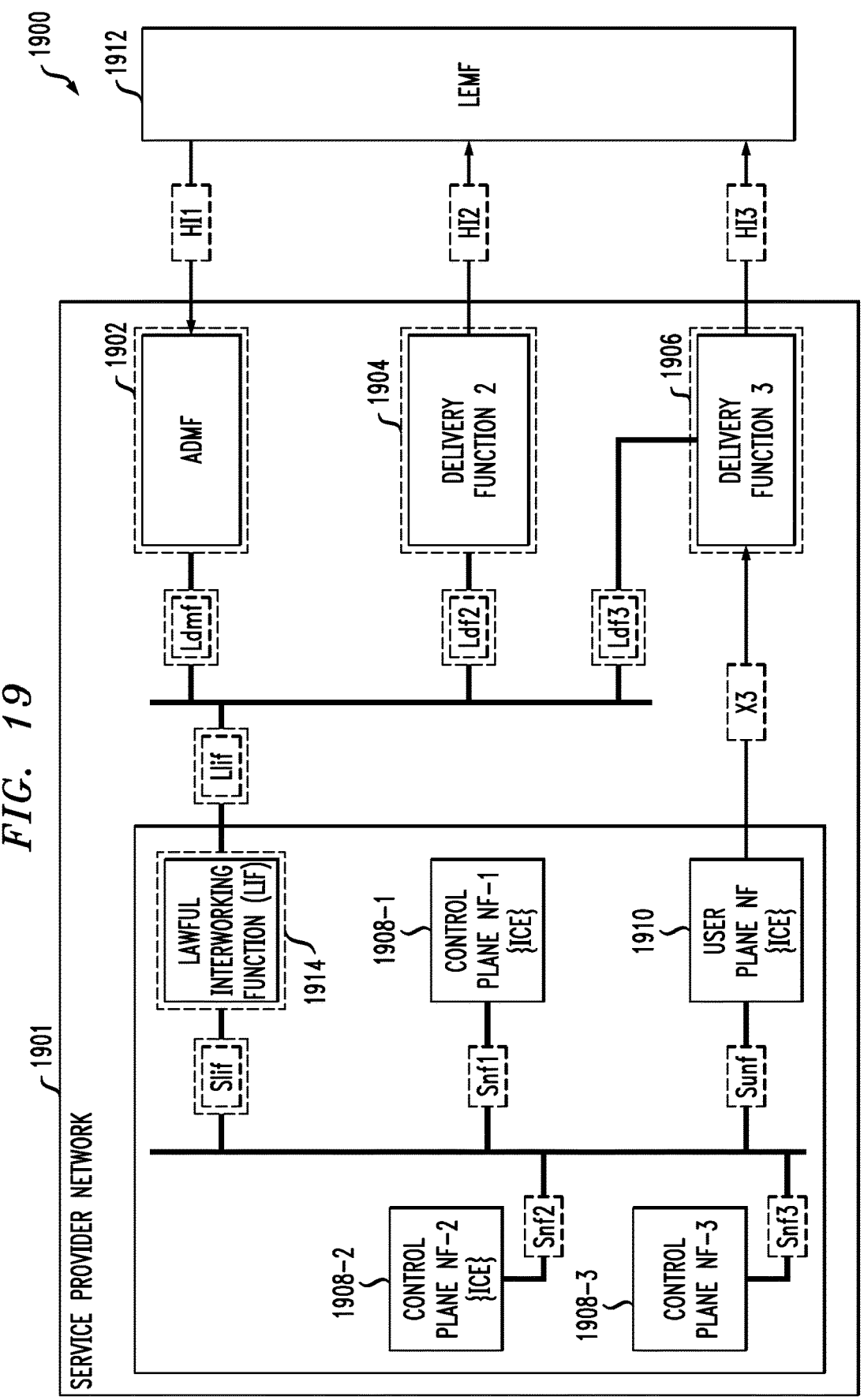
FIG. 19 illustrates a communication system with lawful interception using service-based interfaces according to an illustrative embodiment.
Figure 20:
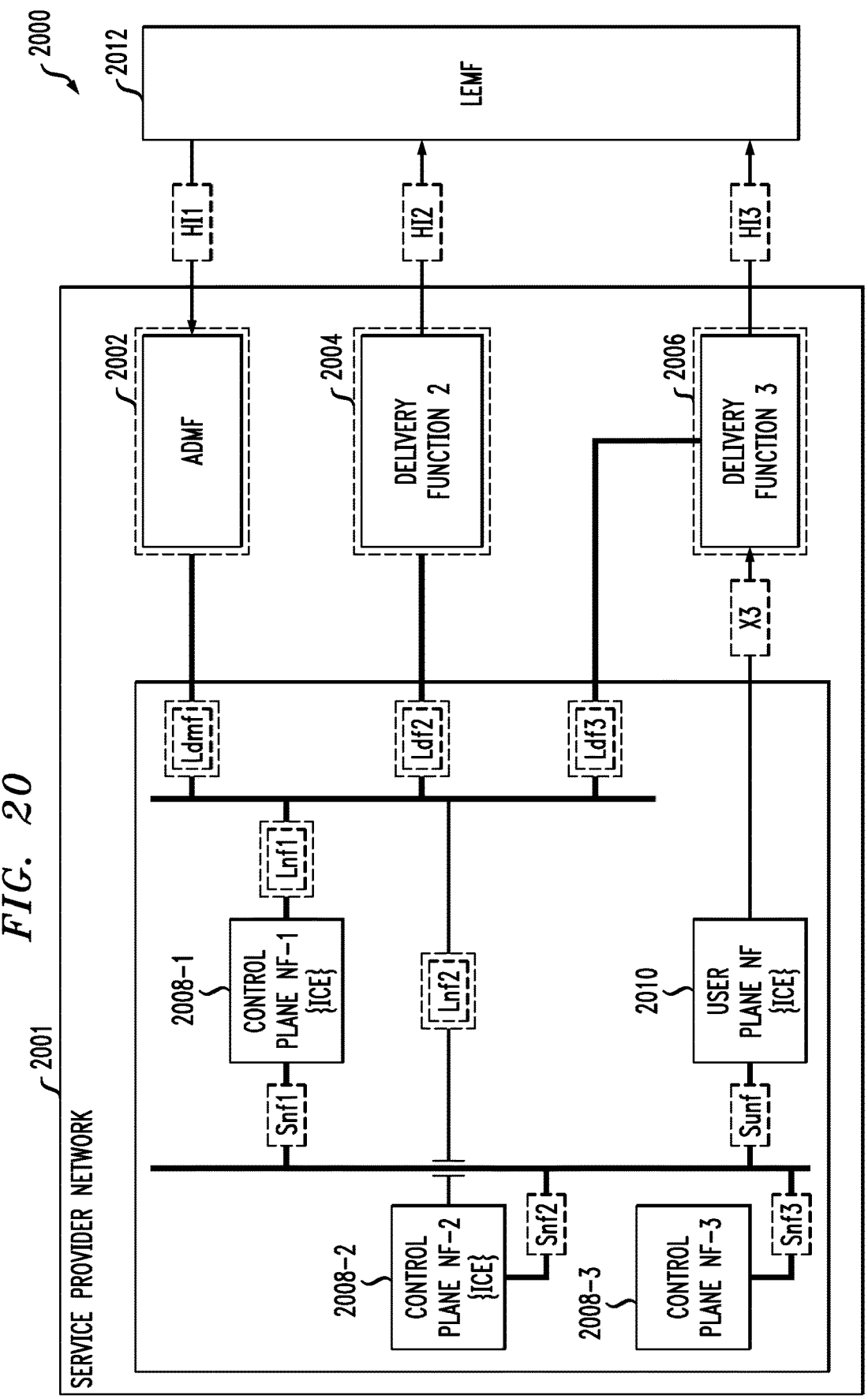
FIG. 20 illustrates a communication system with lawful interception using service-based interfaces according to an illustrative embodiment.

It is realized herein that service providers may adopt service-based interfaces to LI systems (ADMF, DF2 and DF3) but may not integrate to the 5G core system. FIGS. 19 and 20 illustrate embodiments that address these scenarios.

FIG. 19 is an embodiment whereby the new LI specific function LIF is added to the system to interact with the ICEs in the 5G system. As shown in system environment 1900, Service Provider Network 1901 includes ADMF 1902, DF2 1904, and DF3 1906, which function similarly to the similarly named elements described above. ADMF 1902, DF2 1904, and DF3 1906 are operatively coupled to LEMF 1912. Control Plane NF-1 1908-1 and Control Plane NF-2 1908-2 are ICEs for IRI events (Control Plane NF-3 1908-3 does not function as an ICE in this example) and User Plane NF 1910 is an ICE for CC. The network function LIF is denoted as LIF 1914. Note that the LI-specific service interfaces are named differently, i.e., Ldmf for ADMF, Ldf2 for DF2 and Ldf3 for DF3.

As an example:

LI provisioning information from ADMF 1902 to Control Plane NF-1 1908-1 goes through Ldmf, Llif, Slif and Snf1.

LI provisioning information from ADMF 1902 to DF2 1904 goes through Ldmf and Ldf2.

X2 data from Control Plane NF-2 1908-2 goes through Snf2, Slif, Llif, Ldf2. In this embodiment, LI systems (ADMF 1902, DF2 1904, DF3 1906) still support the point-to-point interface to interact with the legacy (e.g., pre-5G) systems that use point-to-point interfaces.

FIG. 20 shows a variation of the embodiment of FIG. 19. As shown in system environment 2000, Service Provider Network 2001 includes ADMF 2002, DF2 2004, and DF3 2006, which function similarly to the similarly named elements described above. ADMF 2002, DF2 2004, and DF3 2006 are operatively coupled to LEMF 2012. Control Plane NF-1 2008-1 and Control Plane NF-2 2008-2 are ICEs for IRI events (Control Plane NF-3 2008-3 does not function as an ICE in this example) and User Plane NF 2010 is an ICE for CC.

Not that, in FIG. 20, the NFs that provide the ICE functions have two service-based interfaces, one specific for LI operations (e.g., Lnf2), and the other for normal network function operations (e.g., Snf2). The motivation behind such an approach is to avoid security implications of passing the LI specific information on the other service-based interfaces. In this approach, the new LI specific function LIF is not needed. The LI specific service interfaces are named differently, i.e., Ldmf for ADMF, Ldf2 for DF2, Ldf3 for DF3, Lnf1 for Control Plane NF-1, and Lnf2 for Control Plane NF-2.

As an example:

LI provisioning information from ADMF 2002 to Control Plane NF-1 2008-1 goes through Ldmf and Lnf1.

LI provisioning information from ADMF 2002 to DF2 2004 goes through Ldmf and Ldf2.

X2 data from Control Plane NF-2 2008-2 goes through Lnf2, Ldf2.

In this embodiment, LI systems (ADMF, DF2, DF3) still support the point-to-point interface to interact with the legacy (e.g., pre-5G) systems that use point-to-point interfaces.

Figure 21:
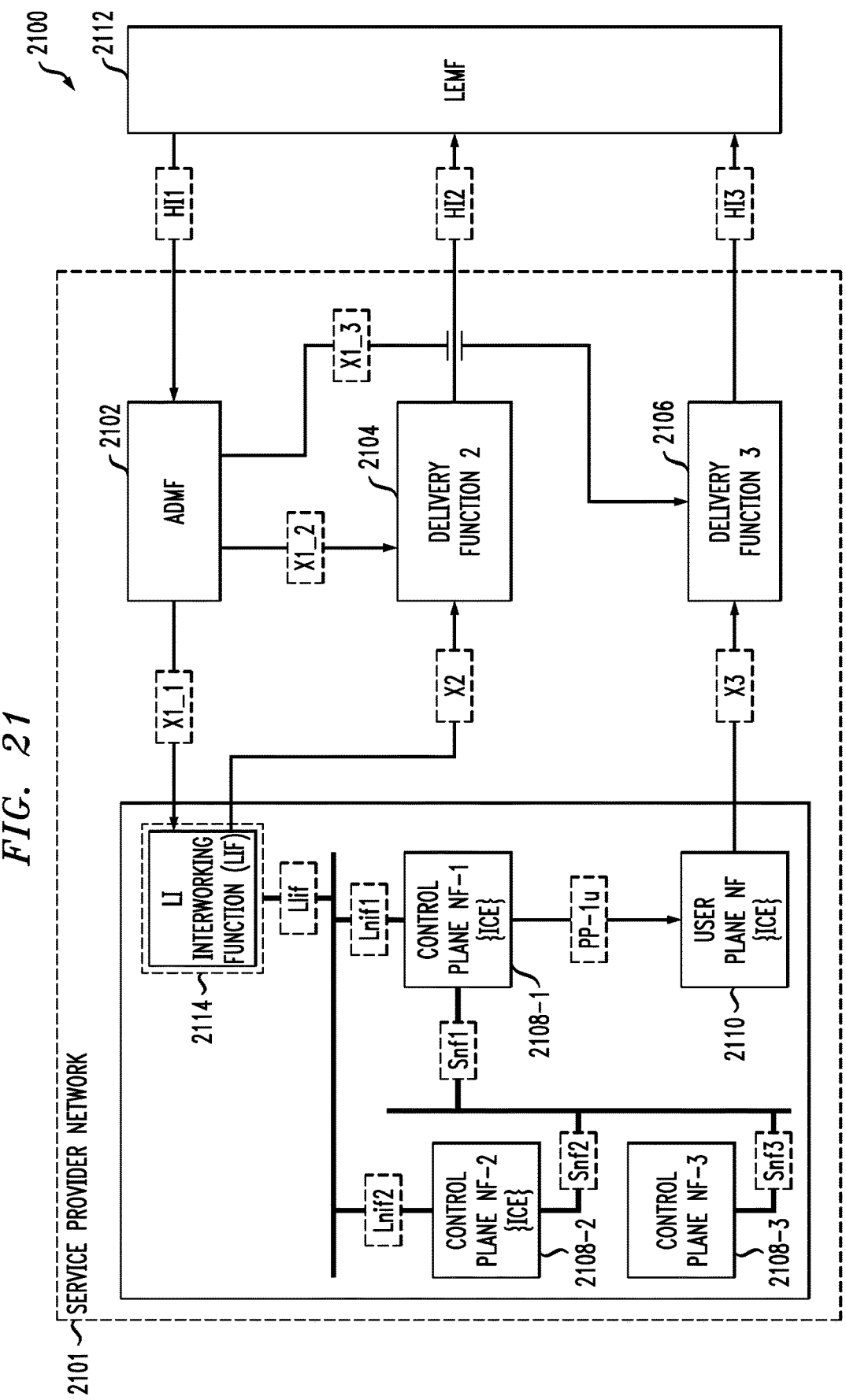
FIG. 21 illustrates a communication system with lawful interception using service-based interfaces according to an illustrative embodiment.

FIG. 21 is an embodiment whereby the LI specific function LIF is added to the system to interact with the ICEs in the 5G system. As shown in system environment 2100, Service Provider Network 2101 includes ADMF 2102, DF2 2104, and DF3 2106, which function similarly to the similarly named elements described above. ADMF 2102, DF2 2104, and DF3 2106 are operatively coupled to LEMF 2112. Control Plane NF-1 2108-1 and Control Plane NF-2 2108-2 are ICEs for IRI events (Control Plane NF-3 2108-3 does not function as an ICE in this example) and User Plane NF 2110 is an ICE for CC. The network function LIF is denoted as LIF 2114.

As shown in FIG. 21, LIF 2114 supports the service-based interface to the network 2101 that has an SBA model and point-to-point interfaces to ADMF 2102 and DF2 2104. In this approach, ADMF 2102 and DF2 2104 continue to use point-to-point interfaces and thus ease backward compatibility.

Figure 22:
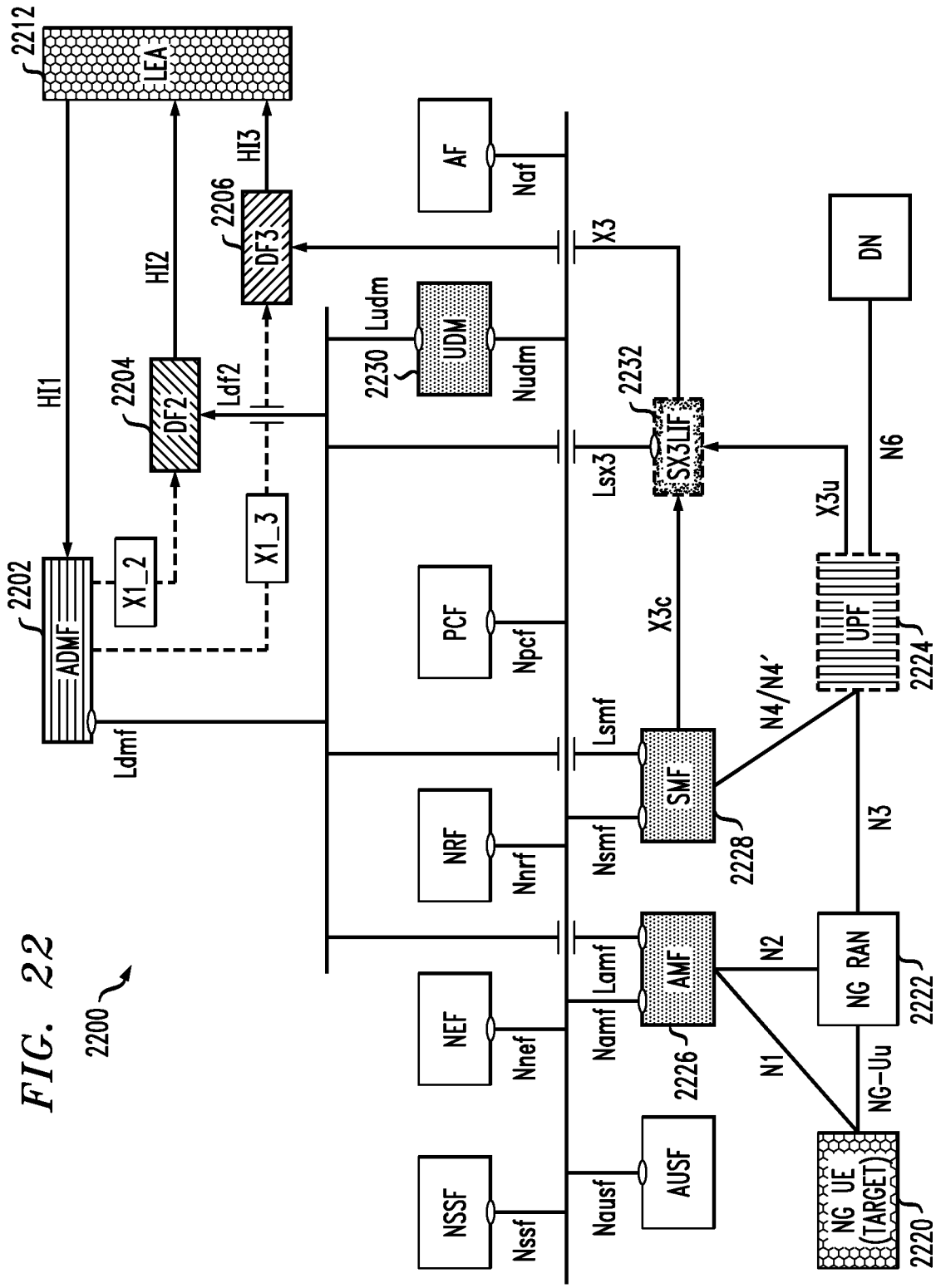
FIG. 22 illustrates a communication system with lawful interception using service-based interfaces according to an illustrative embodiment.

FIG. 22 illustrates system architecture 2200 with LI functions ADMF 2202, DF2 2204, DF3 2206, and LEA 2212, as well as UE 2220 (which is the target of the LI operations), NG RAN 2222, UPF 2224, AMF 2226, SMF 2228, UDM 2230, and SX3LIF 2232.

In this embodiment, ADMF 2202, DF2 2204, and SX3LIF 2232 have service-based interfaces Ldmf, Ldf2, and Lsx3, respectively. AMF 2226, SMF 2228, and UDM 2230 have LI-specific service-based interfaces Lamf, Lsmf, and Ludm respectively. ADMF 2202 provisions: AMF 2226 using Ldmf and Lamf; SMF 2228 using Ldmf and Lsmf; UDM 2230 using Ldmf and Ludm; and SX3LIF 2232 using Ldmf and Lsx3.

AMF 2226, SMF 2228 and SX3LIF 2232 deliver IRI events to DF2 2204 using Ldf2 (AMF 2226 uses Lamf and Ldf2; SMF 2228 uses Lsmf and Ldf2; and SX3LIF 2232 uses Lsx3 and Ldf2). The user-plane traffic as per the 5G SBA model is delivered using point-to-point interface X3. Likewise, UPF 2224 forwards the duplicated packets to SX3LIF 2232 via point-to-point interface X3u.

In this approach, SMF 2228 sends intercept related control information to SX3LIF 2232 via point-to-point interface X3c. As an alternative embodiment, point-to-point interface X3c is eliminated by SMF 2226 sending the intercept related information to SX3LIF 2232 using Lsx3. In some embodiments, SX3LIF 2232 is collocated with UPF 2224 or SMF 2228. However, SX3LIF 2232 is a standalone entity in other embodiments.

Figure 23:
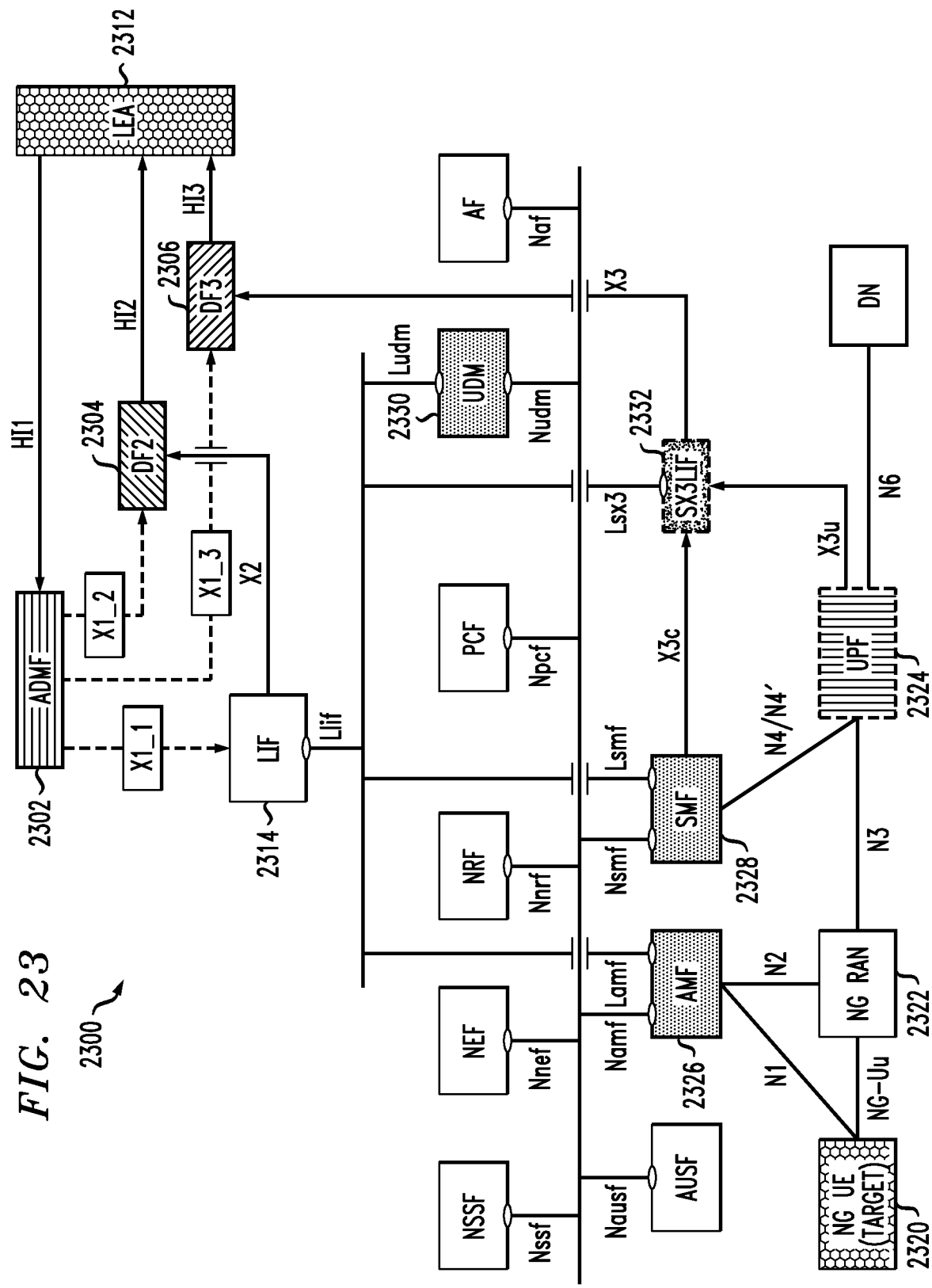
FIG. 23 illustrates a communication system with lawful interception using service-based interfaces according to an illustrative embodiment.

FIG. 23 illustrates system architecture 2300 with LI functions ADMF 2302, DF2 2304, DF3 2306, and LEA 2312, as well as UE 2320 (which is the target of the LI operations), NG RAN 2322, UPF 2324, AMF 2326, SMF 2328, UDM 2330, and SX3LIF 2332. In this embodiment, note also that the LI specific function LIF 2314 is added to the system. This enables the LI system functions to simultaneously support the legacy (e.g., pre-5G) systems that use point-to-point interfaces.

In this embodiment, ADMF 2302 and DF2 2304 have point-to-point interfaces to LIF 2314, and LIF 2314 provides the service-based interface Llif to interact with the 5G network. LIF 2314 passes on provisioning information from ADMF 2302 to: AMF 2326 using Llif and Lamf; SMF 2328 using Llif and Lsmf; UDM 2330 using Llif and Ludm; and SX3LIF 2332 using Llif and Lsx3.

AMF 2326, SMF 2328, and SX3LIF 2332 deliver IRI events to LIF 2314 using Llif (AMF 2326 uses Lamf and Llif; SMF 2328 uses Lsmf and Llif; and SX3LIF 2332 uses Lsx3 and Llif). The user-plane traffic as per the 5G SBA model is delivered using point-to-point interface X3. Likewise, UPF 2324 forwards the duplicated packets to SX3LIF 2332 via point-to-point interface X3u.

In this approach, SMF 2328 sends intercept related information to SX3LIF 2332 via point-to-point interface X3c. As an alternative embodiment, point-to-point interface X3c is eliminated by SMF 2326 sending the intercept related information to SX3LIF 2332 using Lsx3. In some embodiments, SX3LIF 2332 is collocated with UPF 2324 or SMF 2328. However, SX3LIF 2332 is a standalone entity in other embodiments.

It is also to be appreciated that while LI functionality is illustrated in the figures with respect to certain illustrative NFs (e.g., as ICEs), LI functionality can be implemented in any existing NFs and/or newly introduced NFs.

Below is a summary of abbreviations referenced in the text and/or figures or otherwise related to lawful interception and/or communication systems:

3GPP 3rd Generation Partnership Project
ADMF Administration Function
AF Application Function
AMF Access and Mobility Management Function
AUSF Authentication Server Function
BBIFF Bearer Binding Intercept and Forwarding Function
CALEA Communications Assistance for Law Enforcement Act
CC Call Content (or Communication Content)
CP Control Plane
CSP Communication Service Provider
DF Delivery Function
DF2 Delivery Function 2 (for IRI)
DF3 Delivery Function 3 (for CC)
DN Data Network
EPC Evolved Packet Core
HI1 Handover Interface 1 (for admin)
HI2 Handover Interface 2 (for IRI)
HI3 Handover Interface 3 (for CC)
IAP Internet Access Point
ICE Intercepting Control Element
ID Identity or Identifier
IRI Intercept Related Information
LEA Law Enforcement Agency
LEMF Law Enforcement Monitoring Facility
LI Lawful Interception
LIF LI Interworking Function
NEF Network Exposure Function
NFV Network Function Virtualization
NRF Network Repository Function
NSSF Network Slice Selection Function
PCF Policy Control Function
PDP Packet Data Protocol
(R)AN (Radio) Access Network
SA3 Services and Systems Aspects TSG 3
SDN Software Defined Network
SMF Session Management Function
SX3LIF Split X3 LI Interworking Function
UDM Unified Data Management
UDSF Unstructured Data Storage Function
UPF User Plane Function
X1 Interface (for admin between ADMF and access function)
X2 Interface (for IRI between access function and DF2)
X3 X3 Interface (for CC between access function and DF3

It should therefore again be emphasized that the various embodiments described herein are presented by way of illustrative example only, and should not be construed as limiting the scope of the claims. For example, alternative embodiments can utilize different communication system configurations, user equipment configurations, base station configurations, key pair provisioning and usage processes, messaging protocols and message formats than those described above in the context of the illustrative embodiments. These and numerous other alternative embodiments within the scope of the appended claims will be readily apparent to those skilled in the art.

What is claimed is:

1. A method comprising:
in a service provider network of a given communication system configured to support lawful interception functionality, provisioning one or more service-based interfaces to enable interaction between one or more lawful interception-specific elements and two or more intercepting control elements, wherein the one or more service-based interfaces enable direct interaction with each of the two or more intercepting control elements in the service provider network.

2. The method of claim 1, wherein the one or more lawful interception-specific elements comprise an administration function and one or more delivery functions.

3. The method of claim 2, wherein the administration function and the one or more delivery functions are operatively coupled to a monitoring entity.

4. The method of claim 1, wherein the two or more intercepting control elements comprise two or more network functions of the service provider network.

5. The method of claim 4, wherein at least one of the two or more network functions comprises a network function associated with at least one of a control plane and a user plane of the service provider network.

6. The method of claim 1, further comprising provisioning an interworking function specific for lawful interception functionality, wherein the interworking function comprises:
a service-based interface to interact with the two or more intercepting control elements associated with a control plane of the service provider network; and
a point-to-point interface to interact with at least a portion of the one or more lawful interception-specific elements.

7. The method of claim 1, further comprising provisioning an interworking function specific for lawful interception functionality, wherein the interworking function comprises:
a service-based interface to interact with the two or more intercepting control elements associated with a control plane and a user plane of the service provider network; and
a point-to-point interface to interact with at least a portion of the one or more lawful interception-specific elements.

8. The method of claim 1, wherein the one or more lawful interception-specific elements are configured to support the one or more service-based interfaces.

9. The method of claim 1, further comprising provisioning an interworking function specific for lawful interception functionality, wherein the interworking function comprises:
a service-based interface to interact with the two or more intercepting control elements associated with a control plane and a user plane of the service provider network; and
another service-based interface to interact with at least a portion of the one or more lawful interception-specific elements.

10. The method of claim 1, wherein the two or more intercepting control elements each comprise separate service-based interfaces wherein one of the service-based interfaces is dedicated to the lawful interception functionality.

11. The method of claim 1, further comprising provisioning one or more point-to-point interfaces to enable reference-point based interaction between the one or more lawful interception-specific elements and the two or more intercepting control elements, in addition to the one or more service-based interfaces.

12. The method of claim 1, wherein the communication system comprises a 5G system.

13. Apparatus comprising:
in a service provider network of a given communication system configured to support lawful interception functionality, one or more service-based interfaces provisioned to enable interaction between one or more lawful interception-specific elements and two or more intercepting control elements, wherein the one or more service-based interfaces enable direct interaction with each of the two or more intercepting control elements in the service provider network.

14. The apparatus of claim 13, further comprising:
an interworking function specific for lawful interception functionality, wherein the interworking function comprises:
a service-based interface to interact with the two or more intercepting control elements associated with a control plane of the service provider network; and
a point-to-point interface to interact with at least a portion of the one or more lawful interception-specific elements.

15. The apparatus of claim 13, wherein the one or more lawful interception-specific elements comprise an administration function and one or more delivery functions.

16. The apparatus of claim 13, wherein the two or more intercepting control elements comprise two or more network functions of the service provider network.

17. An article of manufacture comprising a non-transitory computer-readable storage medium having embodied therein executable program code that when executed by a processor causes the processor to perform step of:
in a service provider network of a given communication system configured to support lawful interception functionality, provisioning one or more service-based interfaces to enable interaction between one or more lawful interception-specific elements and two or more intercepting control elements, wherein the one or more service-based interfaces enable direct interaction with each of the two or more intercepting control elements in the service provider network.

18. The article of claim 17, further configured to:
provision an interworking function specific for lawful interception functionality, wherein the interworking function comprises:
a service-based interface to interact with the two or more intercepting control elements associated with a control plane of the service provider network; and
a point-to-point interface to interact with at least a portion of the one or more lawful interception-specific elements.

19. The article of claim 17, wherein the one or more lawful interception-specific elements comprise an administration function and one or more delivery functions.

20. The article of claim 17, wherein the two or more intercepting control elements comprise one or more network functions of the service provider network.

* * * * *